United States Patent [19]

Morrill

[11] 4,382,717
[45] May 10, 1983

[54] CONNECTION OF UNDERWATER LINES

[75] Inventor: Charles D. Morrill, Bellaire, Tex.

[73] Assignee: Smith International, Inc., Newport Beach, Calif.

[21] Appl. No.: 283,094

[22] Filed: Jul. 13, 1981

Related U.S. Application Data

[63] Continuation of Ser. No. 973,895, Dec. 28, 1978, abandoned.

[51] Int. Cl.³ .............................................. F16L 1/04
[52] U.S. Cl. .................................. 405/169; 166/347; 285/23
[58] Field of Search ............... 405/157, 158, 169, 195; 166/338, 339, 340, 344, 347, 212; 285/18, 23, 24, 27, 45

[56] References Cited

U.S. PATENT DOCUMENTS

| 2,956,818 | 10/1960 | Dickerson | 285/18 |
| 3,029,874 | 4/1962 | Turman | 166/212 |
| 3,302,709 | 2/1967 | Postlewaite | 166/340 |
| 3,419,071 | 12/1968 | Williams et al. | 166/347 X |
| 3,481,396 | 10/1966 | Williams et al. | 166/339 |
| 3,586,103 | 6/1971 | Brown et al. | 166/339 |
| 3,592,014 | 7/1971 | Brown | 405/169 |
| 3,710,859 | 1/1973 | Hanes | 166/339 |
| 3,722,585 | 3/1973 | Nelson et al. | 166/339 |
| 3,729,941 | 5/1973 | Rochelle | 405/169 |
| 3,837,685 | 9/1974 | Miller | 285/45 |
| 3,843,168 | 10/1974 | Morrill et al. | 285/24 |
| 4,019,334 | 4/1977 | Sinclair et al. | 405/169 |
| 4,086,778 | 5/1978 | Latham et al. | 405/169 X |

OTHER PUBLICATIONS

"Deepwater Pipeline Connections—A Subsystem of the Submerged Production System", Sinclair et al.—Paper Number OTC 2526, Offshore Technology Conference, May 1976.
Offshore Services, Jan. 1978, pp. 26-51.

Primary Examiner—David H. Corbin
Attorney, Agent, or Firm—Ned L. Conley; David Alan Rose; William E. Shull

[57] ABSTRACT

Underwater flow lines, control lines and electrical conduits are connected to mating hubs on an underwater manifold center or other production unit by utilizing hydraulically powered means for pulling the lines toward the mating hubs and aligning them therewith, lock-down means actuated from the surface being utilized to lock the lines in axial alignment with the hubs, and a seal member being lowered from the surface and inserted between the facing hubs, with a split clamp being used to draw the hubs into sealing engagement with the seal means.

24 Claims, 27 Drawing Figures

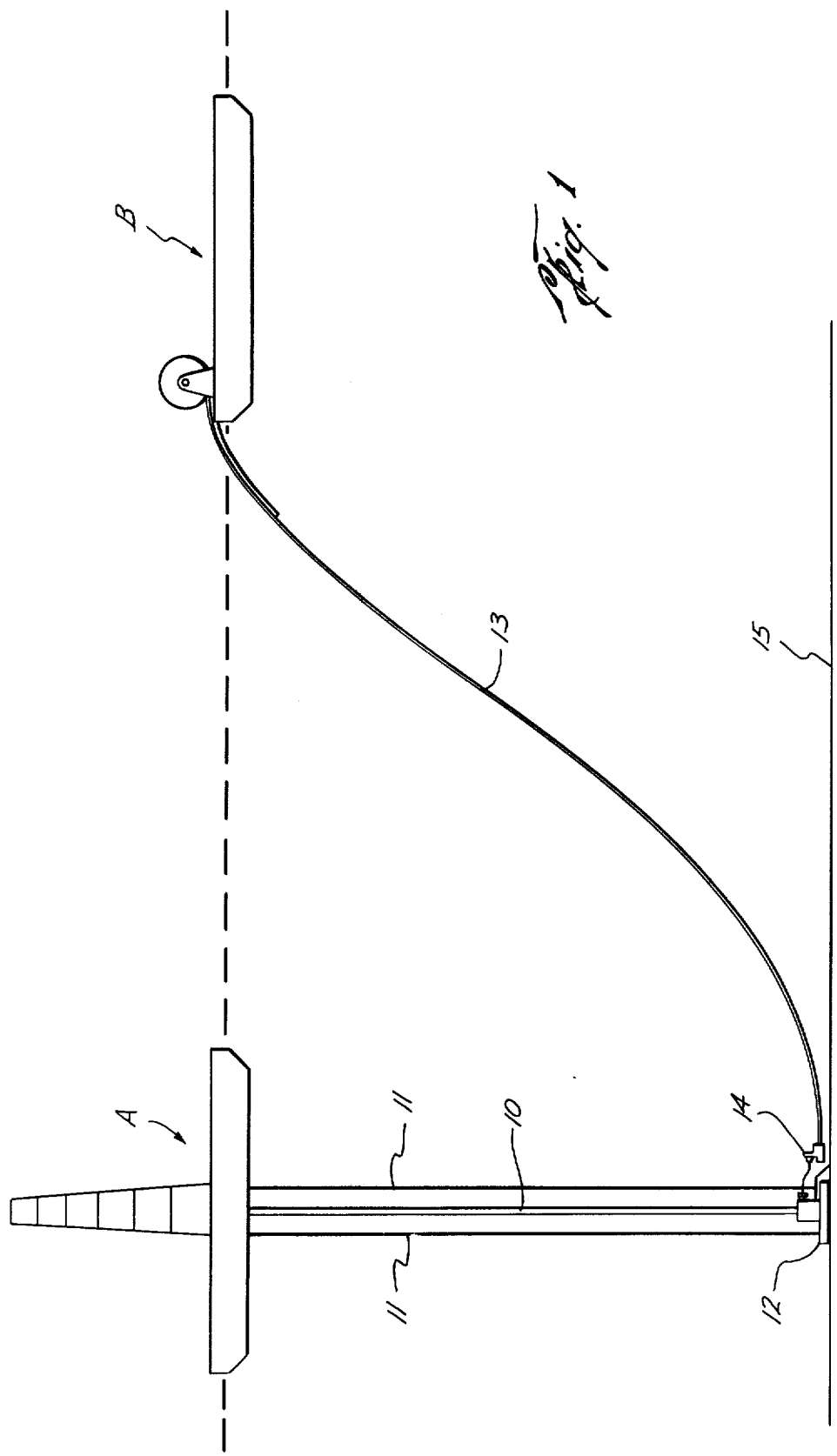

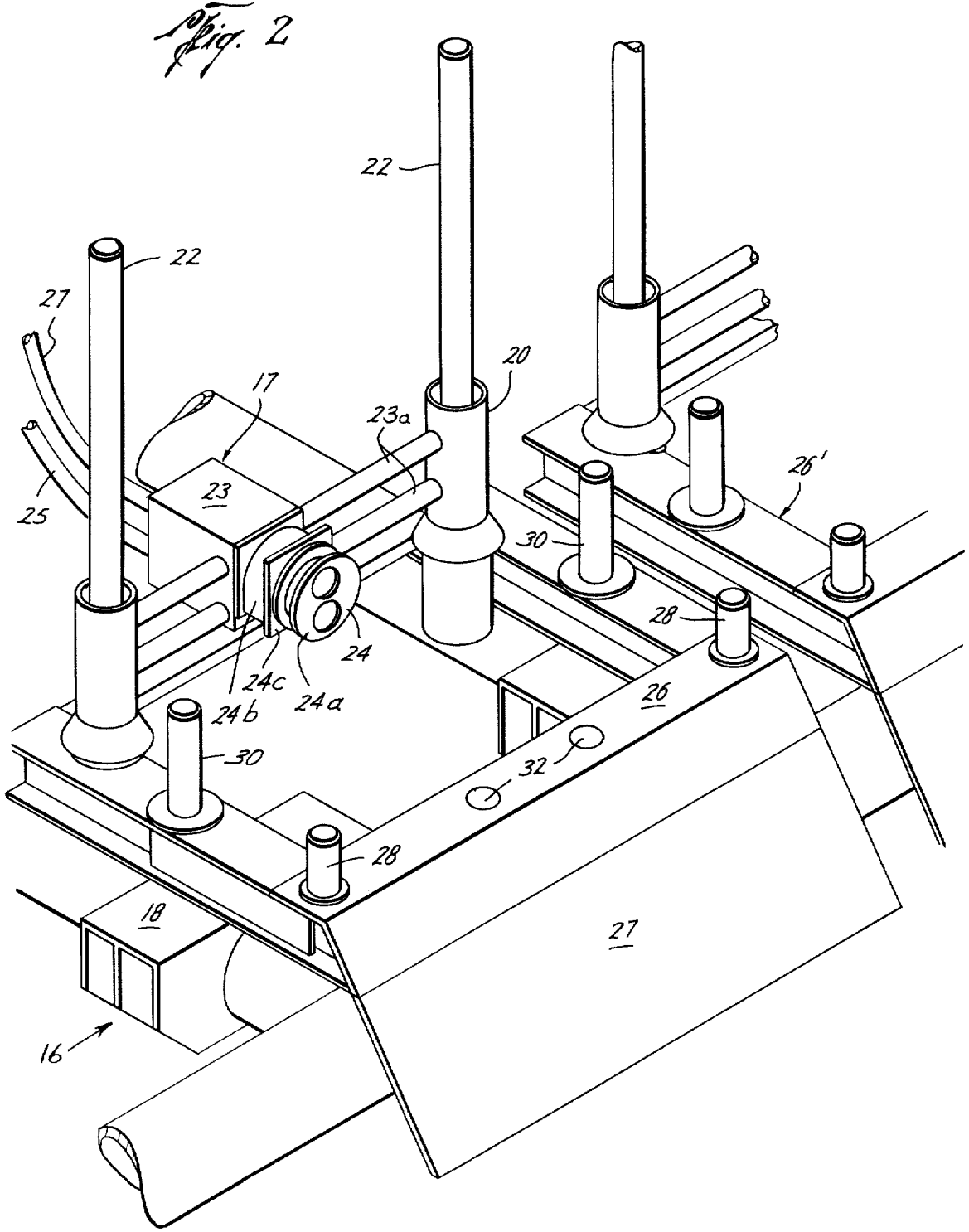

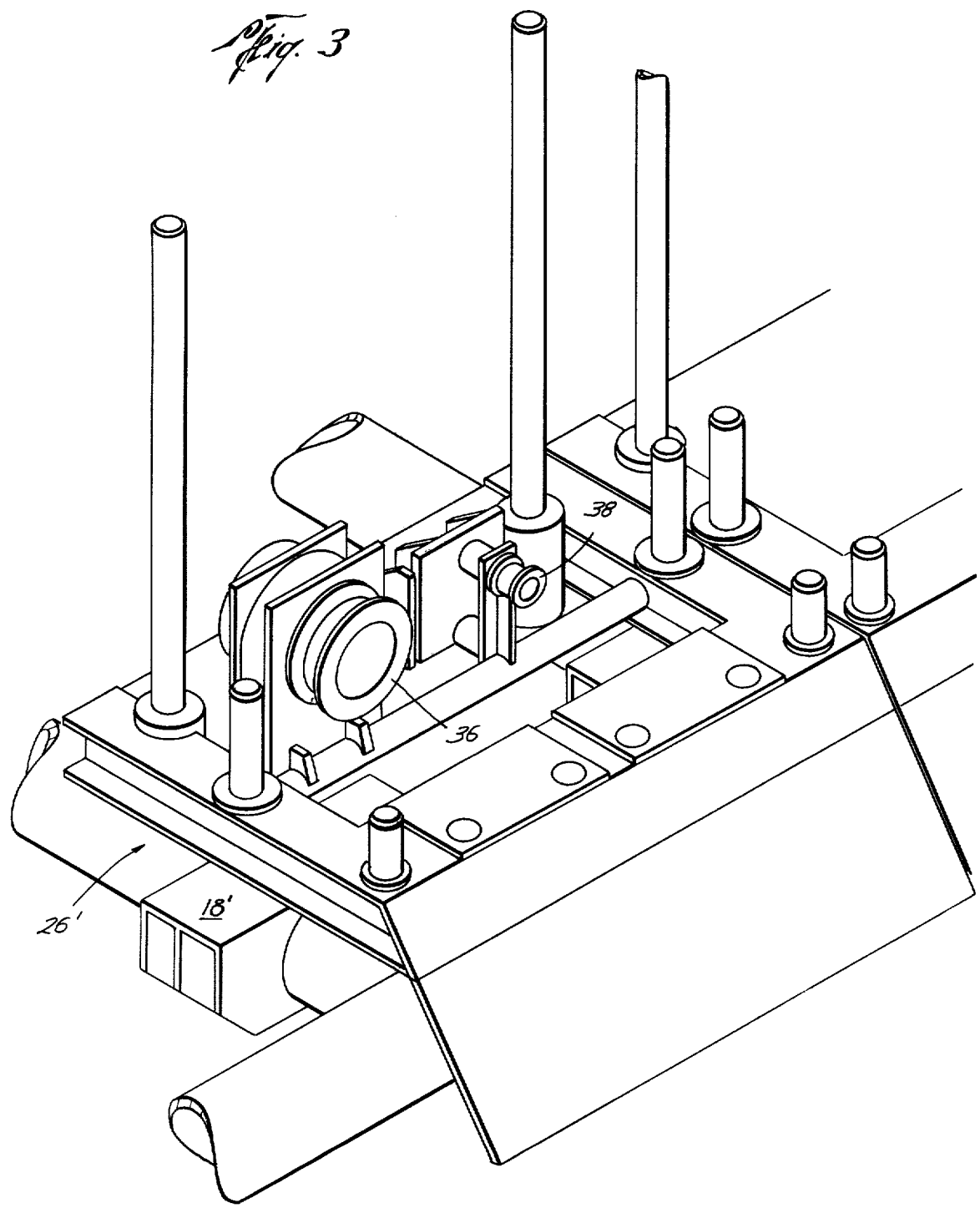

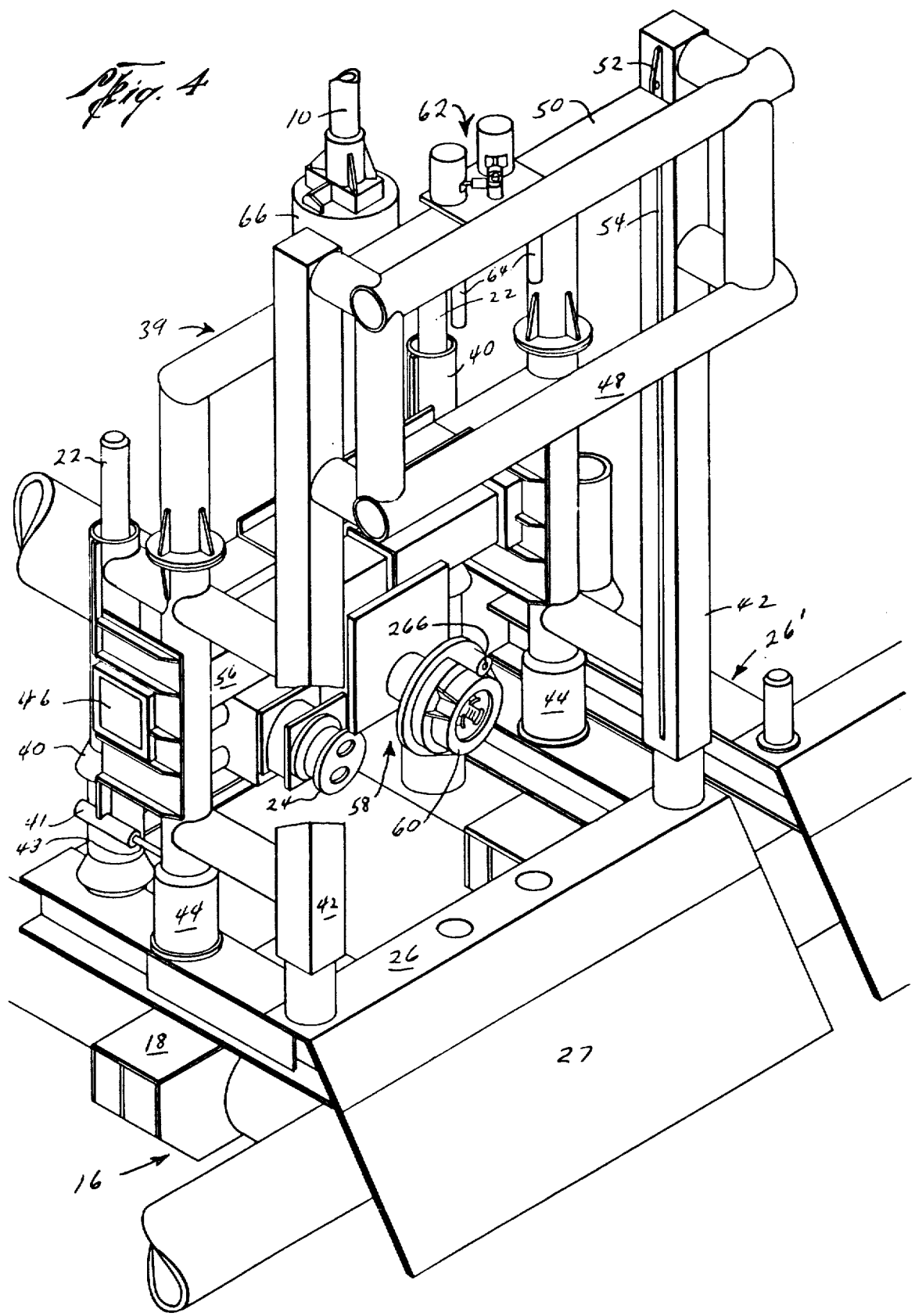

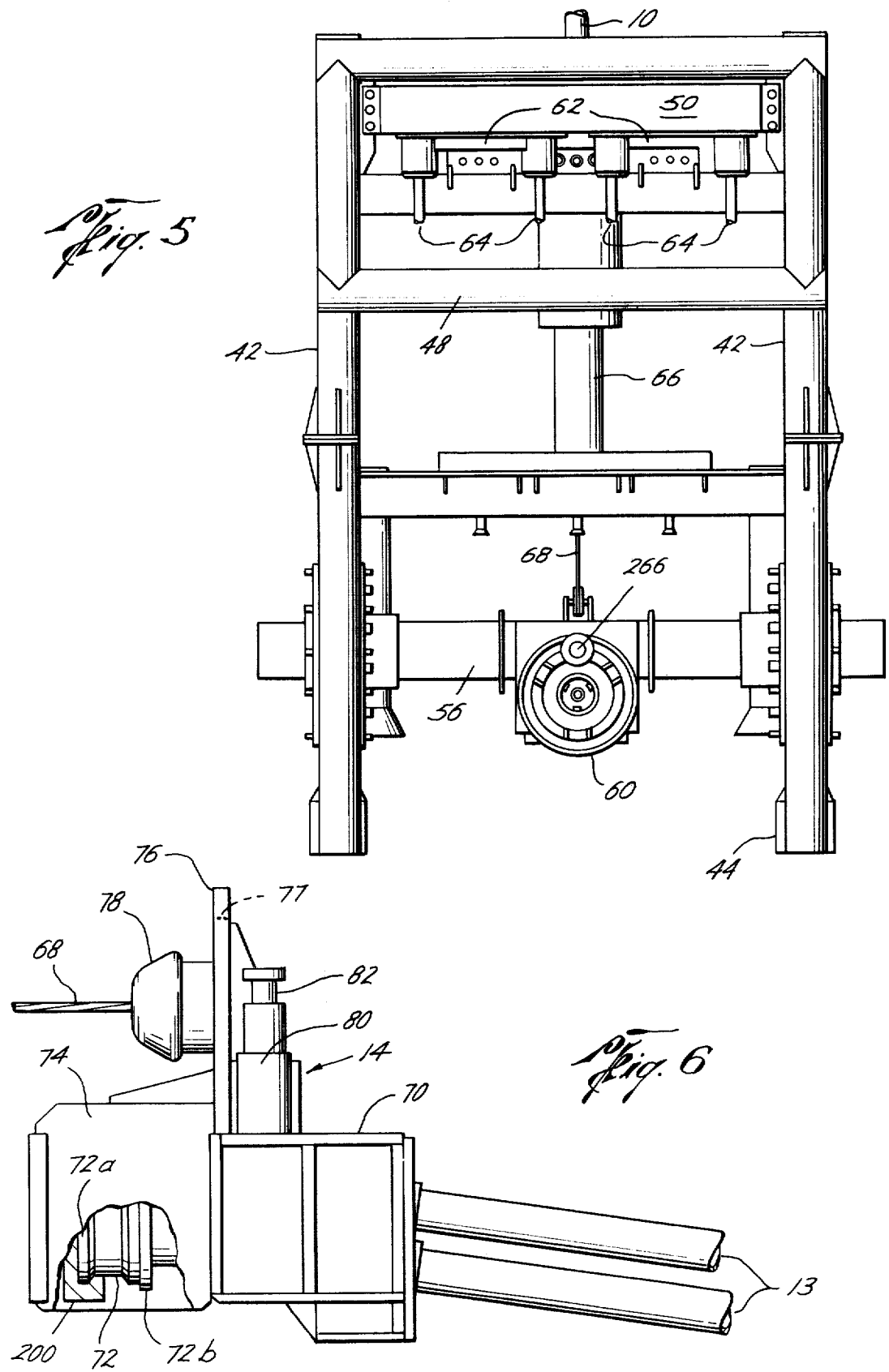

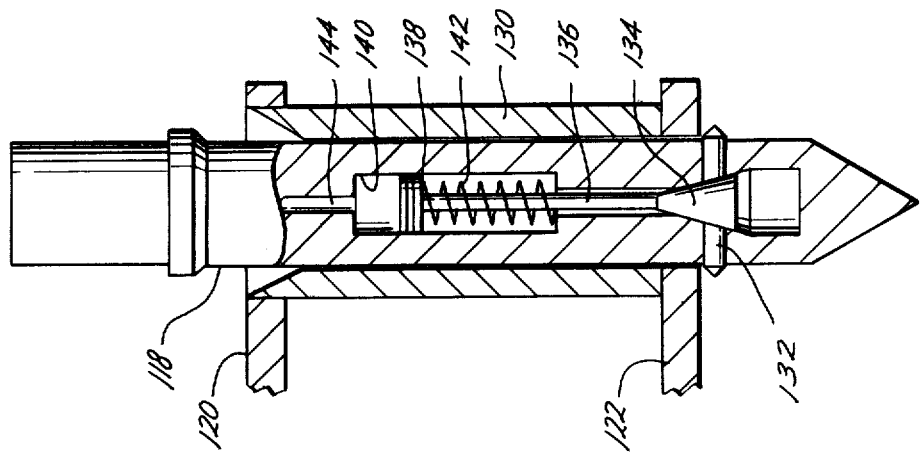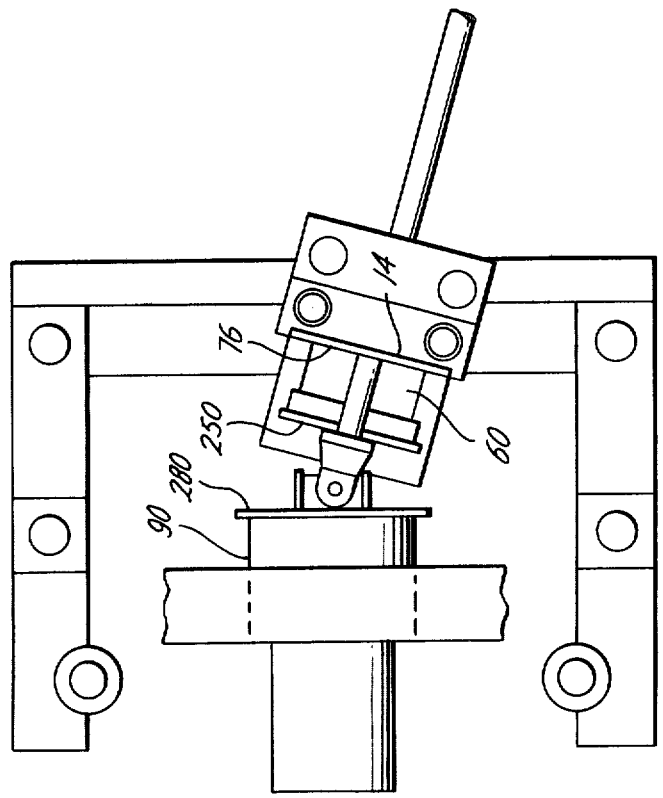

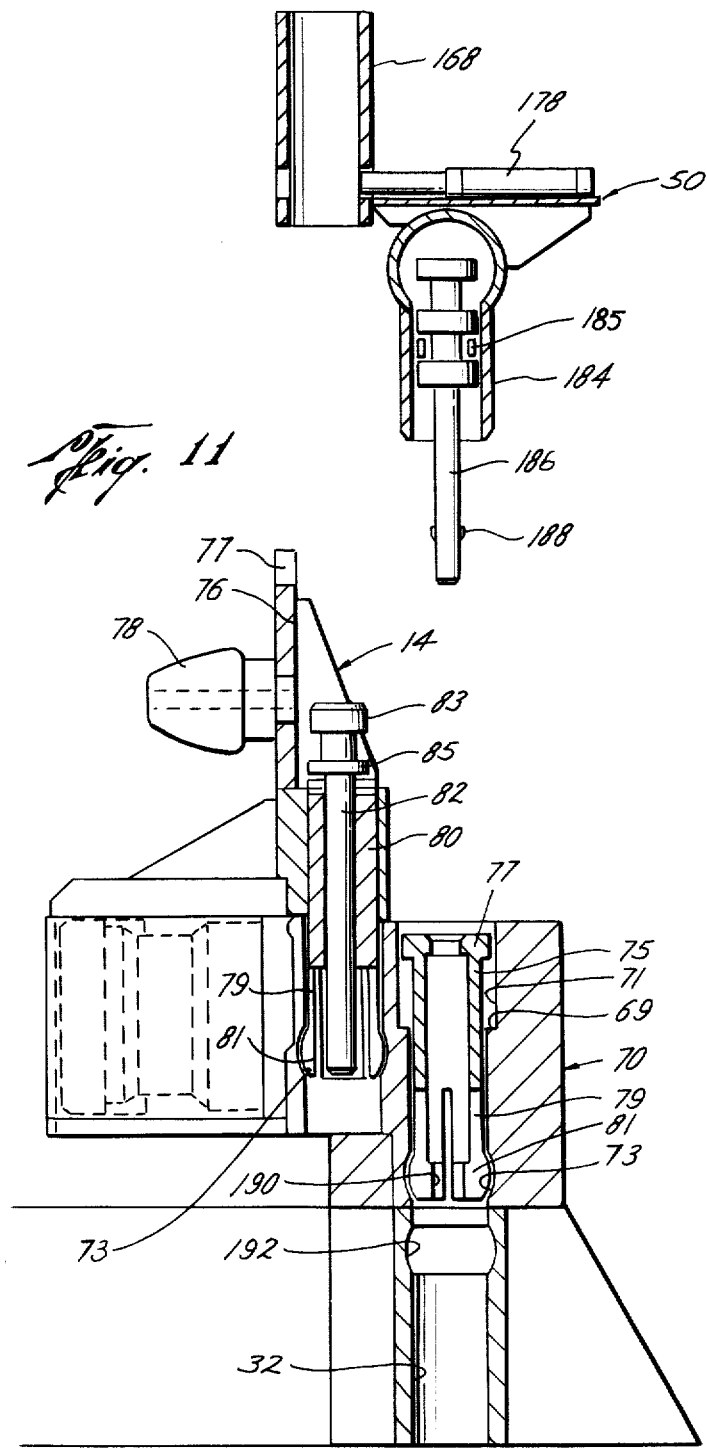

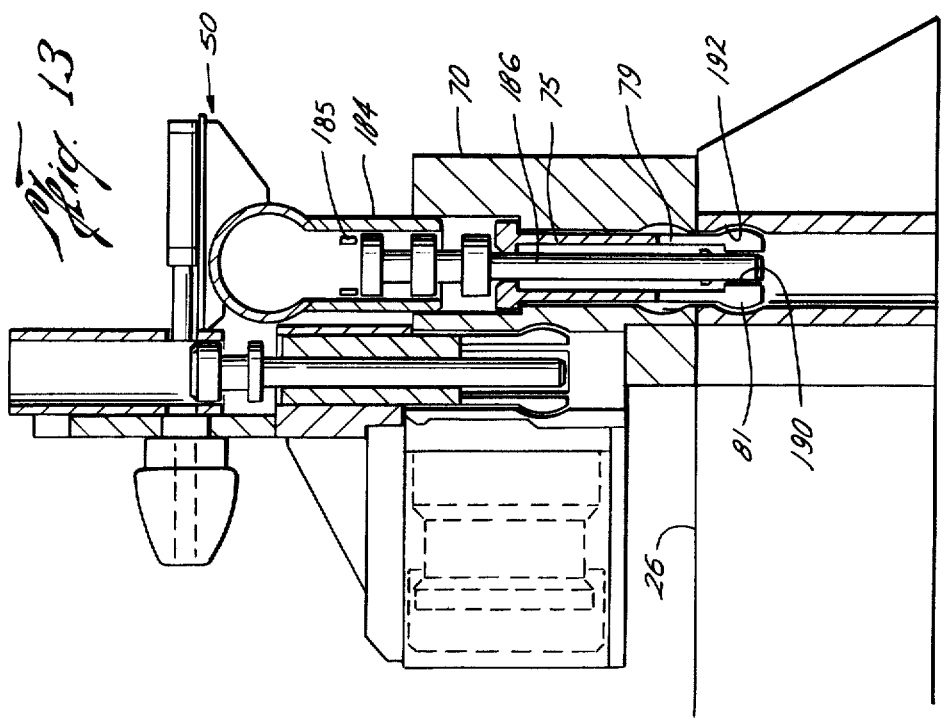
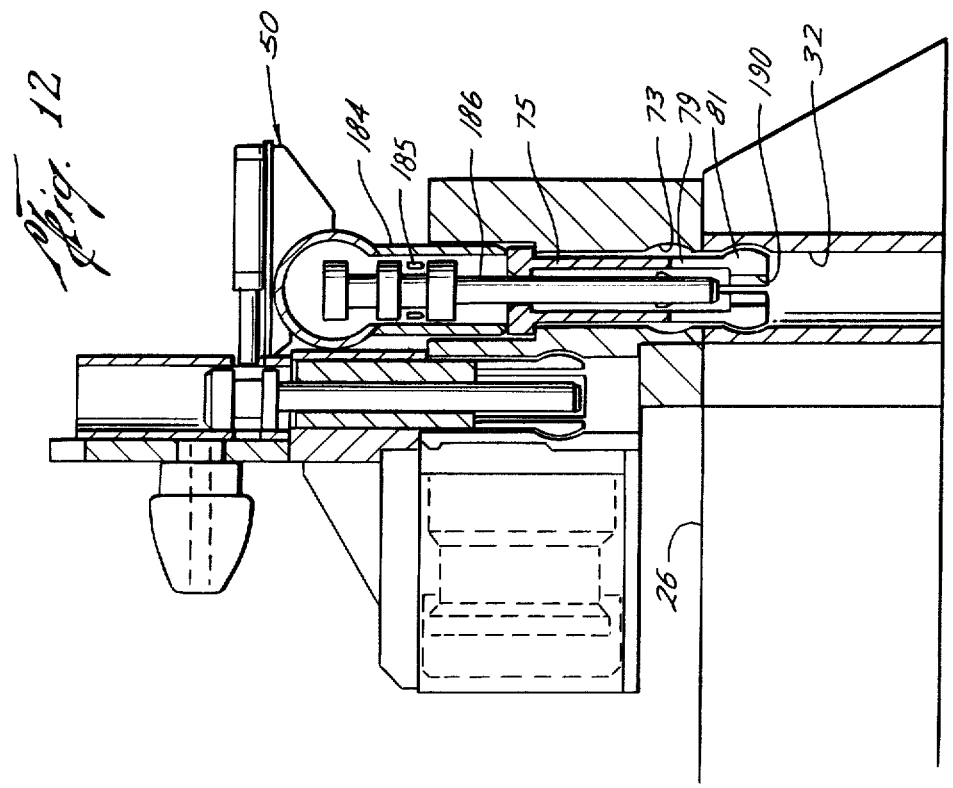

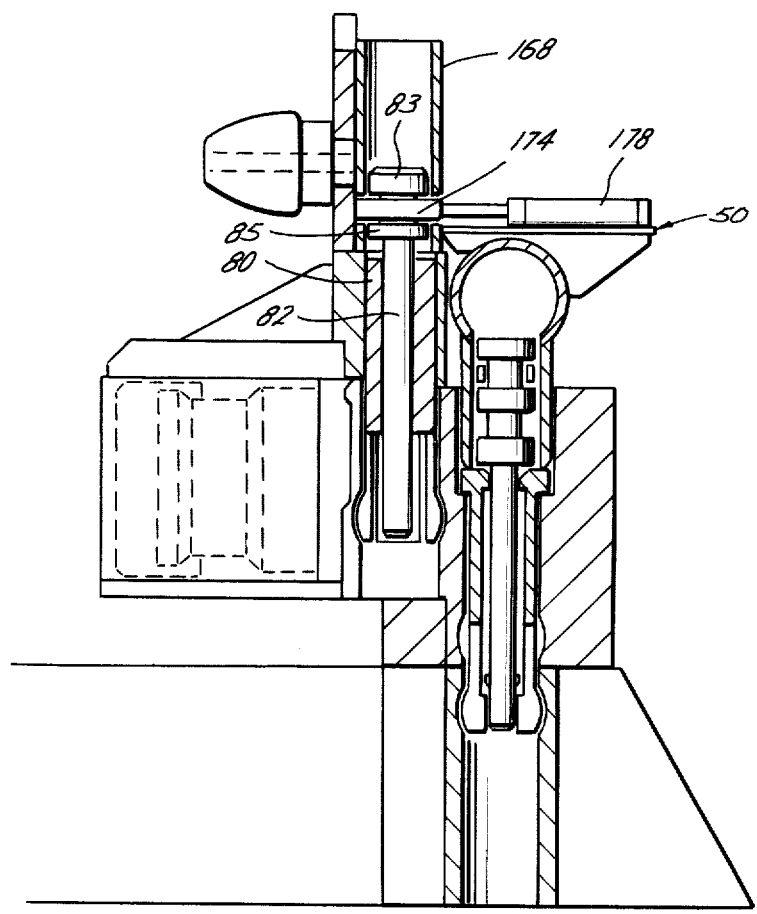

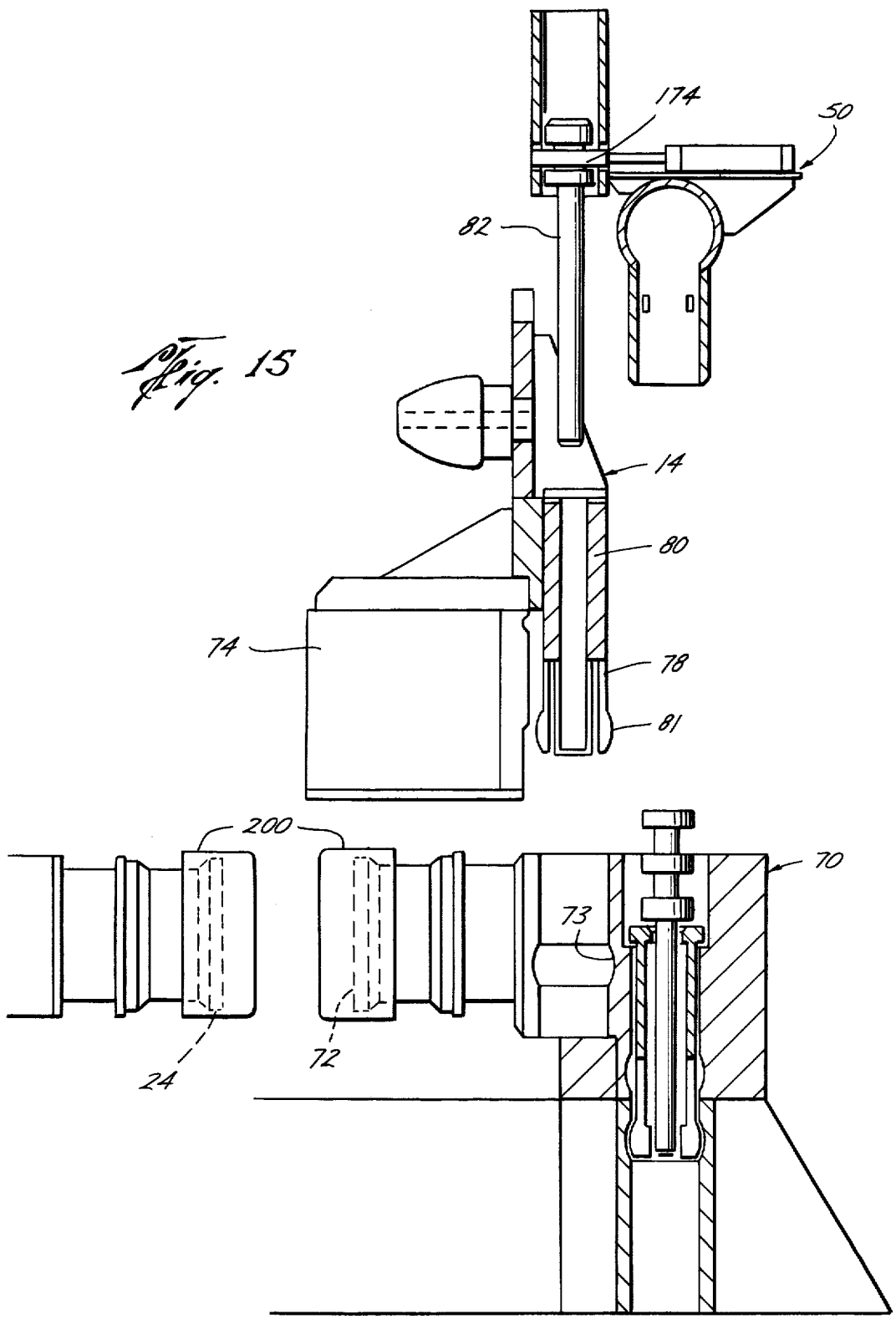

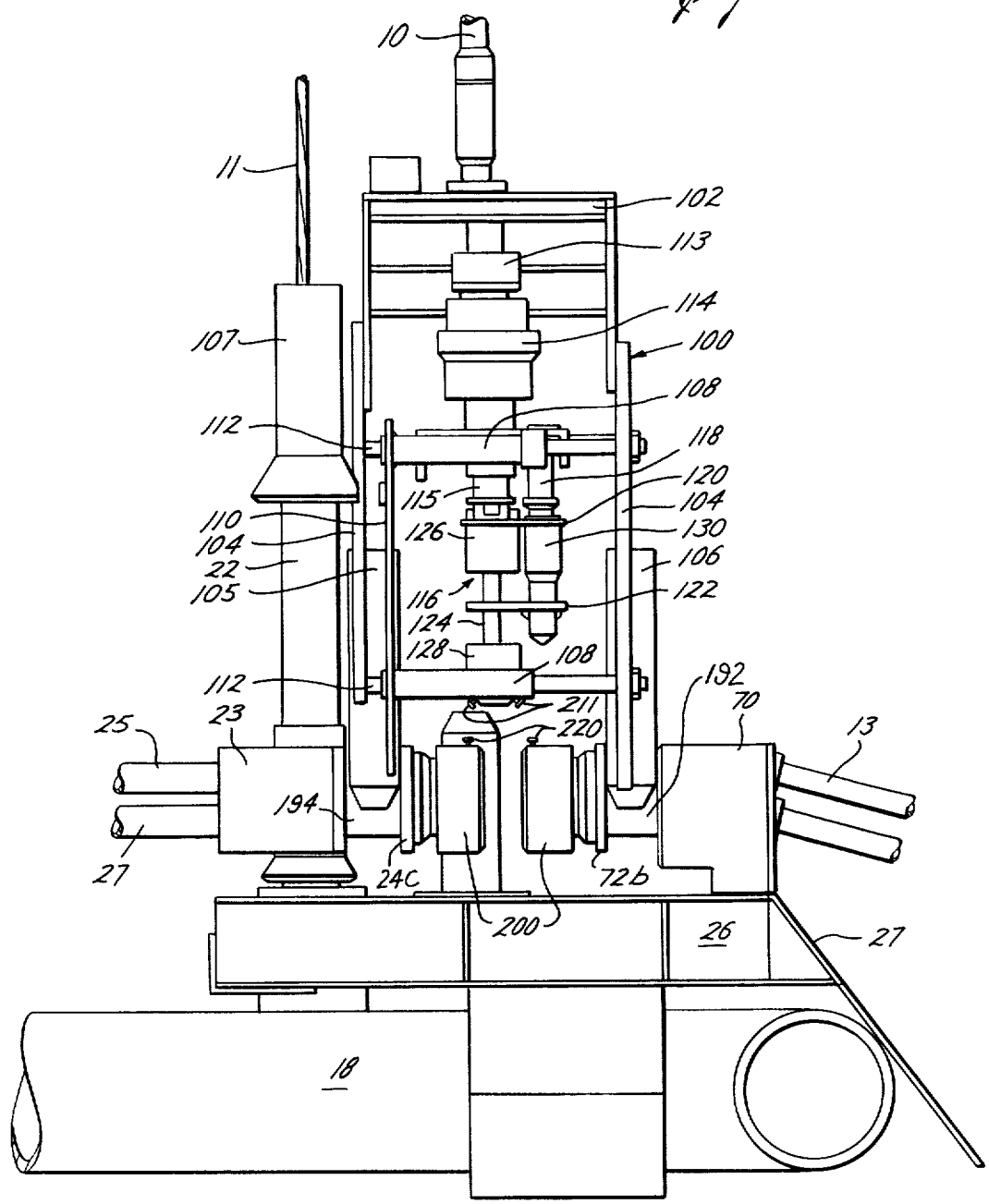

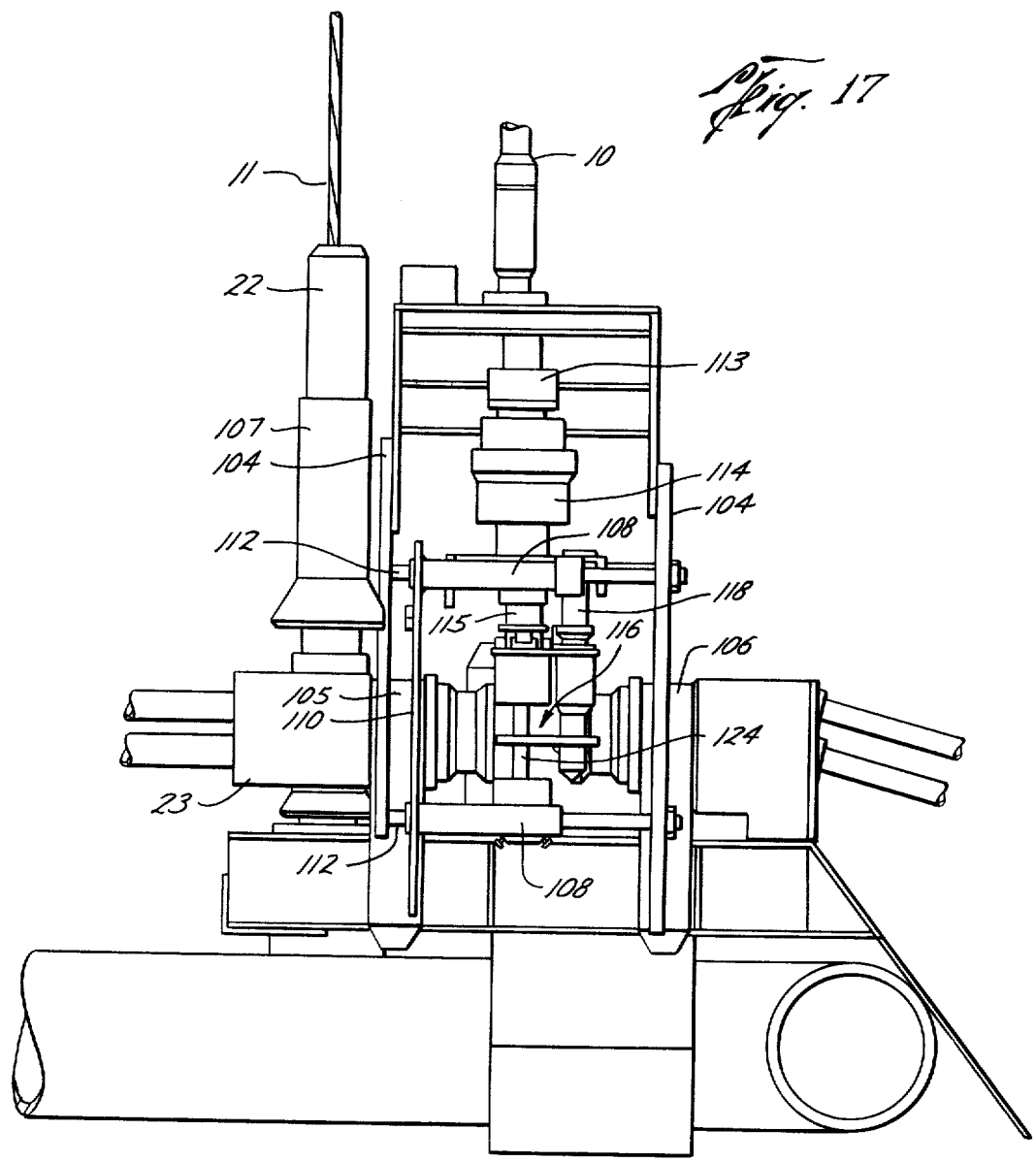

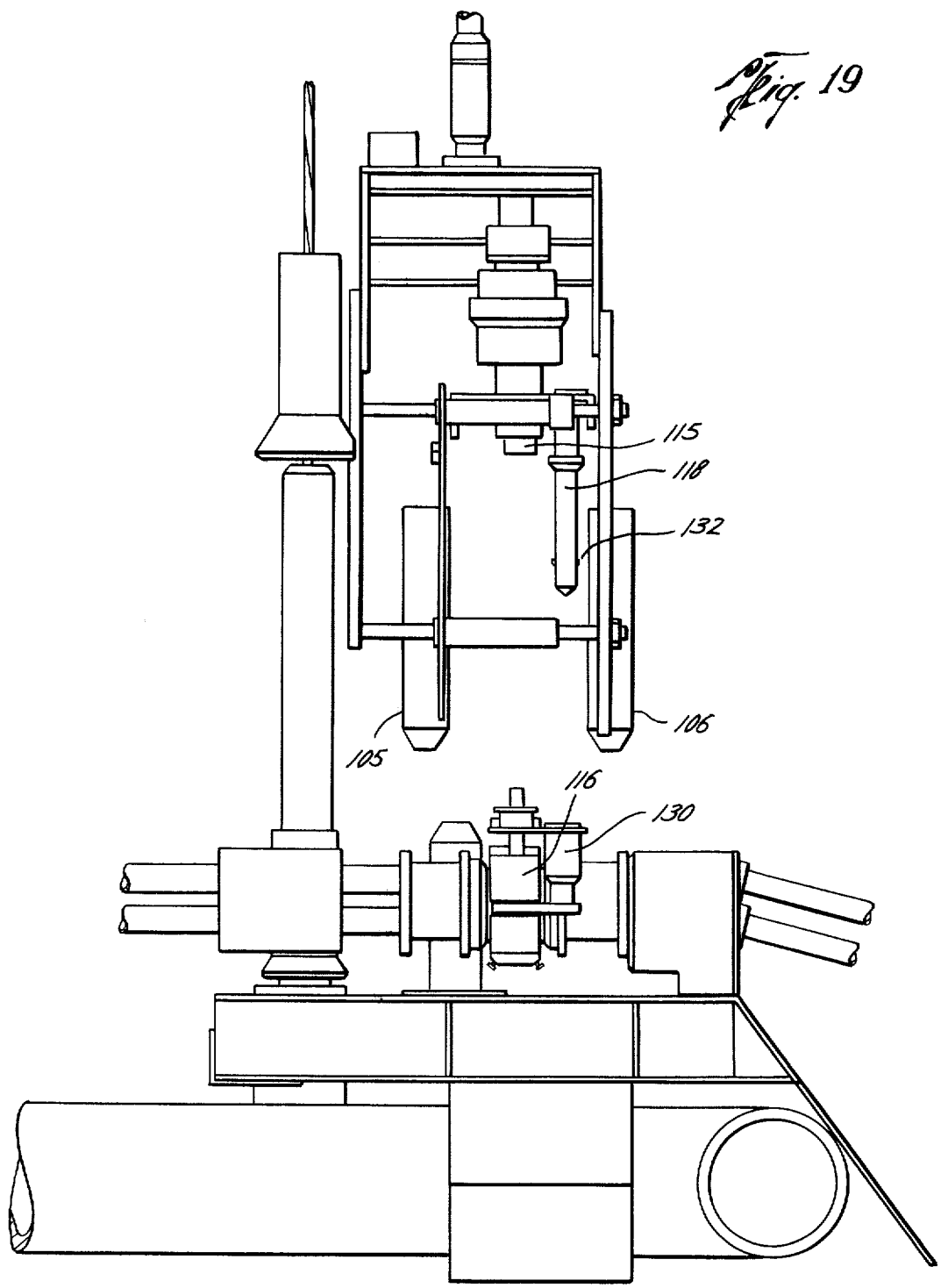

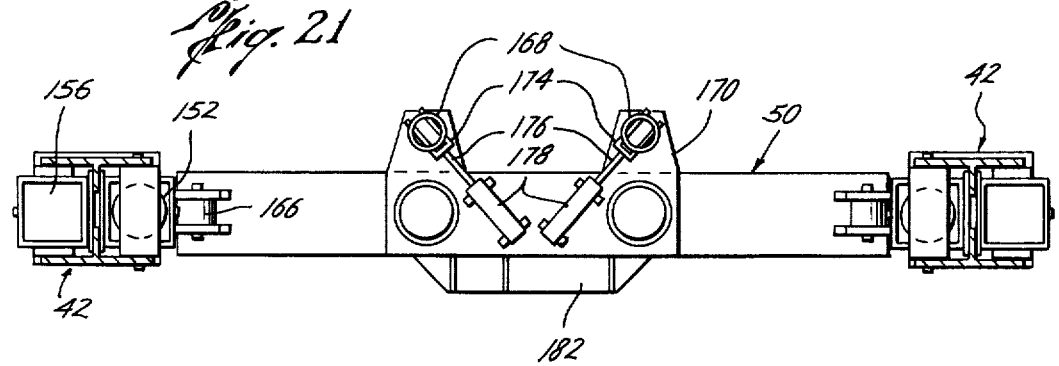
Fig. 21
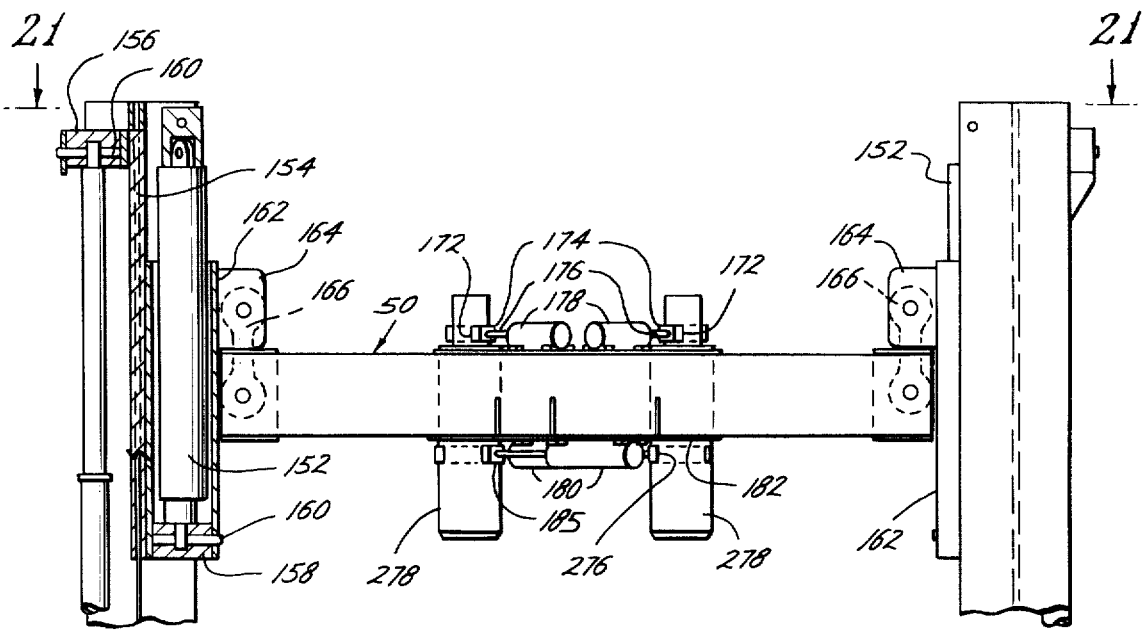
Fig. 20
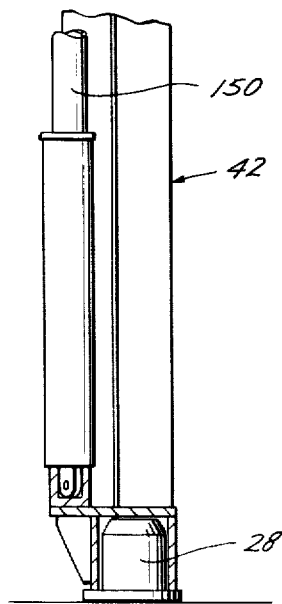
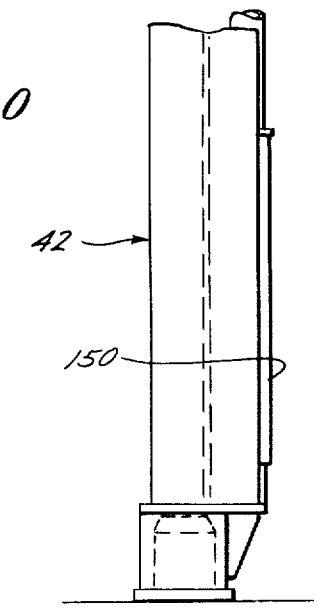

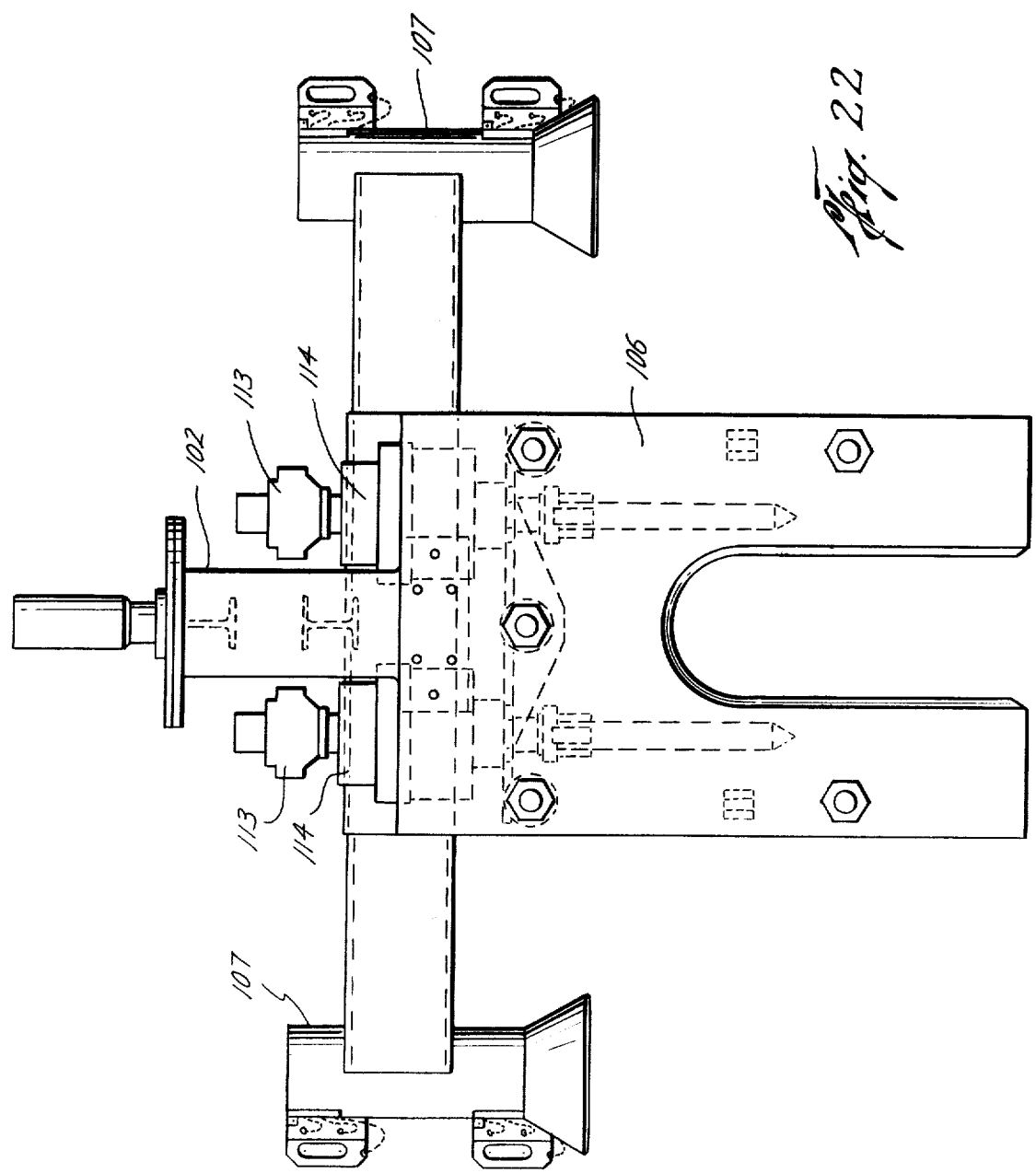

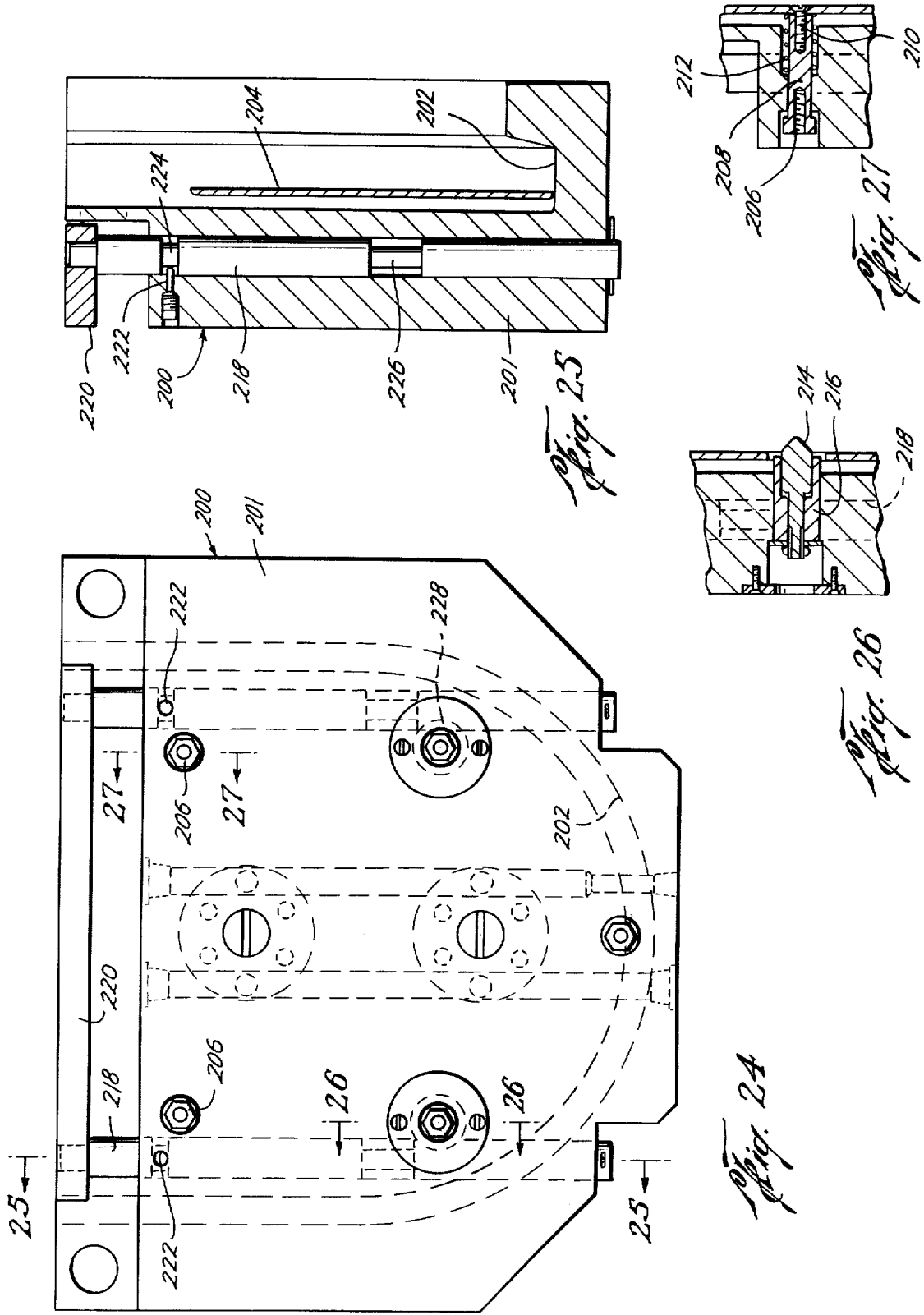

CONNECTION OF UNDERWATER LINES

This is a continuation of application Ser. No. 973,895 filed Dec. 28, 1978, now abandoned.

BACKGROUND OF THE INVENTION

1. Field of the Invention.

This invention relates to the remote connection of underwater flow lines and other conduits to a production unit such as an underwater manifold center, without the use of divers.

2. Description of the Prior Art.

The original offshore oil and gas wells were completed on platforms resting on the ocean bottom, or were completed on the bottom and surface production facilities installed on such a platform. Oil and gas from such platforms was either collected by tankers or by flow lines laid on the bottom. To the extent that underwater work was required, it was performed by divers, by submarines, or by simple manipulations from the surface.

More recently it has become necessary to drill oil and gas wells in water which is too deep, or too dangerous, for convenient underwater operations by divers, or for use of platforms standing on the bottom. It has thus become necessary to devise methods of completing oil and gas wells on the bottom, and connecting them up with underwater pipe lines, hydraulic control lines and electrical cables for operation of underwater equipment, without the use of divers or any permanent surface structure adjacent the underwater well. Various devices have heretofore been proposed for connecting such underwater flow lines, etc., as shown for example in U.S. Pat. Nos. 3,968,838 to Baugh, 4,019,334 to Sinclair, et al., and 4,086,778 to Latham, et al. A better understanding of the problems presented may be obtained by reference to the January 1978 issue of Offshore Services magazine, published by Spearhead Publications Limited, at pages 26 to 51.

SUMMARY OF THE INVENTION

The present invention provides a means and method for connecting underwater lines, including flow lines, control lines, and electrical cables from a remote location on the surface of the water, providing a sealed connection between such lines, by means of a tool which is lowered from the surface and which is fully recovered to the surface after the connection is made. The apparatus of this invention allows the further use of the same tool for later breaking the connection and replacing or modifying the sealing elements if this becomes necessary.

Apparatus which has previously been designed for this purpose has required the application of high bending loads to the guide posts of the underwater base units upon which production units are supported. In addition, such apparatus has generally included hydraulic cylinders and other tools which are left on the bottom after the connection is made, thereby increasing the cost of operation since such tools cannot be used again. Previous designs also have failed to provide for re-entry to retrieve seal members or hubs which have previously been connected.

The apparatus and method of the present invention overcomes these deficiencies of the prior art, providing means for absorbing horizontal reaction to forces which result from pulling hubs together to connect them. A connector tool is provided to lower the seal unit to the location where the connection is to be made, to pull the facing hubs into sealing engagement with the seal unit, and to secure the hubs in sealing engagement with the seal unit. The entire connector tool can then be removed to the surface. The design is such that the connector tool can also be returned to the subsea location and the process reversed so as to retrieve the seal unit and replace it with an identical or a different seal unit. The connector tool is entirely retrievable, no portion of it being required to remain on the bottom.

BRIEF DESCRIPTION OF THE DRAWINGS

The accompanying drawings illustrate the presently preferred embodiment of the invention. However, since the invention has never actually been constructed or used, it is anticipated that further improvements in the design of individual elements may take place before final use of the invention.

FIG. 1 is a view of a section of the sea depicting the vessels used in performing the process of this invention together with a schematic representation of the apparatus of this invention;

FIG. 2 is a perspective view of the base structure of the apparatus of this invention, showing an inboard hub for connection to a flow line;

FIG. 3 is a perspective view of another embodiment showing hubs for connection of hydraulic and electrical lines;

FIG. 4 is a perspective view of the pull-in tool used to pull a flow line into position to be connected;

FIG. 5 is an elevational view of the tool of FIG. 4;

FIG. 6 is an elevational view of the end of the flow line hub with a pull-in adapter thereon which enables it to be pulled into position for connection;

FIG. 10 is a plan view of the apparatus in FIG. 8;

FIG. 11 is an elevational view, partly in section, of a flow line hub and connected pull-in adapter;

FIGS. 12 to 15 inclusive are elevational views similar to FIG. 11, showing successive stages of operation;

FIG. 16 is an elevational view of the connector tool of this invention, shown in position just before engaging the hubs to be connected;

FIGS. 17, 18 and 19 are elevational views of the apparatus of FIG. 16, shown at successive stages of operation;

FIG. 20 is an elevational view, partially in section, of the portion of the pull-in tool used to operate locking mechanism between the pull-in adapter, the hub and the base;

FIG. 21 is a plan view, partially in section, of the apparatus of FIG. 20;

FIG. 22 is an elevational view of the connector tool shown in FIGS. 16 to 19, taken at right angles to FIG. 16;

FIG. 23 is a vertical sectional view of a pin mechanism forming a part of the tool of FIG. 22;

FIG. 24 is an elevational view of a protective cover used on the hubs according to the invention;

FIG. 25 is a vertical sectional view of the protective color of FIG. 24, taken at line 25—25 of FIG. 24;

FIG. 26 is a sectional view taken at line 26—26 of FIG. 24; and

FIG. 27 is a sectional view taken at line 27—27 of FIG. 24.

DESCRIPTION OF THE PREFERRED EMBODIMENTS

Figure 7:
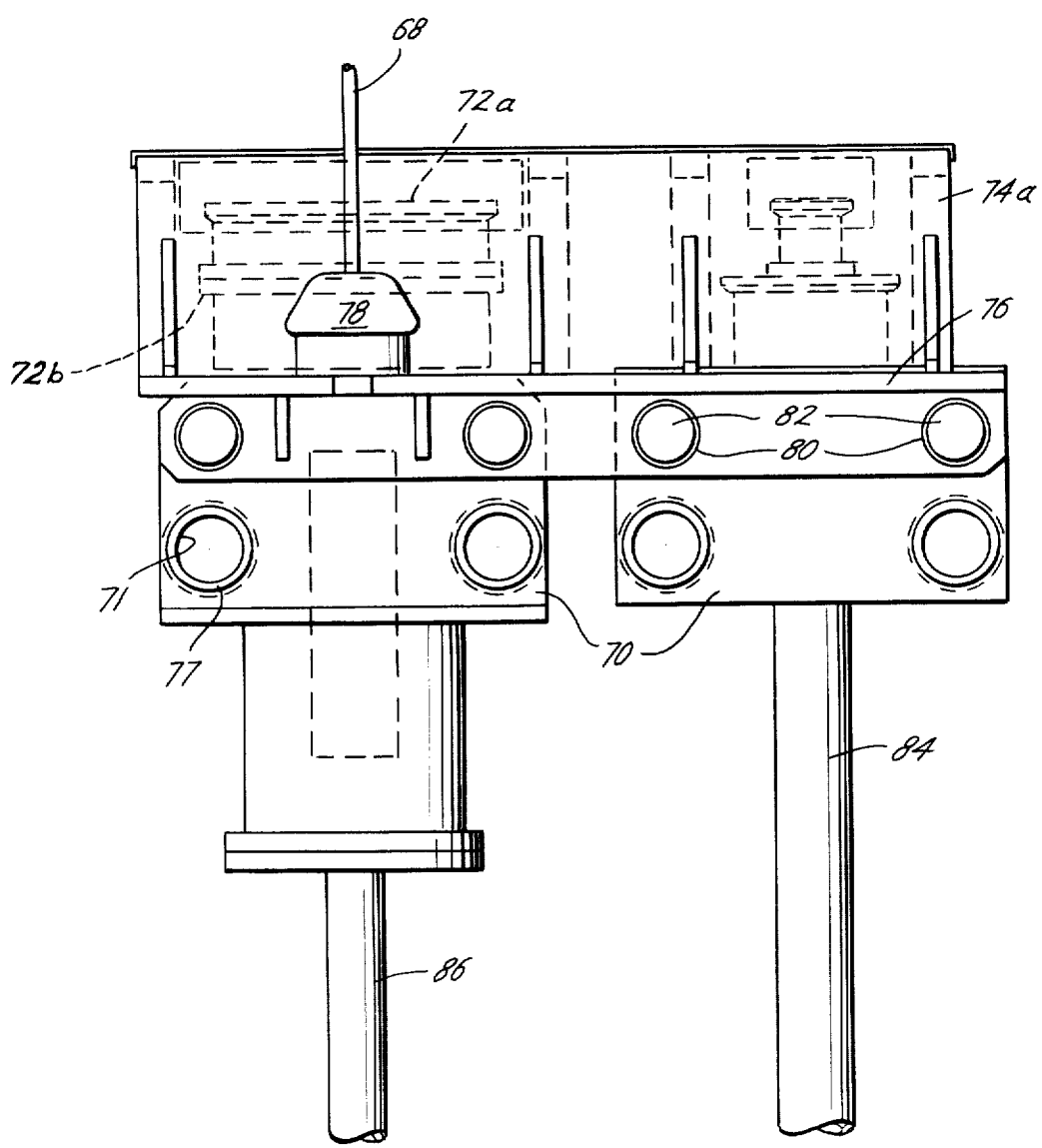
FIG. 7 is a plan view of the end of hydraulic and electric line hubs with a pull-in adapter thereon.

Referring first to FIG. 1 of the drawing there is illustrated a floating vessel A having a drill pipe 10 and various guidlines 11 extending downwardly therefrom to an underwater production unit 12. Another vessel B constitutes a pipe laying barge such as is well known in the art for laying underwater pipe lines for oil and gas, having depending therefrom a flowline 13 which is fitted at its end near the underwater production unit 12 with a pull-in adapter 14. The underwater production unit and the pull-in adapter 14 are shown resting on the subsea bottom 15.

In FIG. 2 of the drawing there is illustrated a portion of an underwater manifold center 16 which constitutes a production unit 17, only a part of which is shown, and a base 18, which may be provided for gathering oil or gas produced from one or a number of wells and for transferring the produced oil or gas to a flow line. As shown in FIG. 2, a production unit such as a christmas tree, has been landed on the base 18, being guided into position thereon by engagement of guide tubes 20 with guide posts 22. An inboard hub 24 is mounted on the production unit, being longitudinally slidably supported between the guide tubes 20 by means of a bearing housing 23 mounted on bars 23a. The hub includes a sealing face 24a, and a cylindrical bearing portion 24b, with an intermediate collar 24c. The bearing portion is slidably received within a bearing (not shown) in bearing housing 23, and is connected to flowline loops 25, 27. The outboard portion of the base constitutes a porch 26 having an outwardly and downwardly sloping ramp 27 which extends downwardly over the edge of the manifold center adjacent to the subsea bottom. The base is also provided with four upwardly extending reaction posts 28, 30, and with lock down holes 32 which are adapted to receive lock down posts 34 (see FIG. 11) as will be later explained.

Another porch 26' shown mounted adjacent porch 26 may be used, for example, for connecting lines such as hydraulic control lines and electrical cables. Although the procedures and apparatus described herein are suitable for all of such connections, this description will be primarily in terms of connection of flow lines. Such modifications as may be necessary to connect other types of lines will be apparent to those skilled in the art. FIG. 3, however, shows a connection base 18' on which are mounted means for connection of both electrical cables at coupling 36 and hydraulic control lines at coupling 38.

In FIG. 4 of the drawing a pull-in tool 39 has been landed on the porch 26. As shown, it has been guided into place by means of the engagement of guide tubes 40 with the guide posts 22. Legs 42, 44 have also engaged the reaction posts 28, 30 respectively. The legs 44 are connected to the guide tubes 40 by means of structural members 46. The upper ends of legs 42 are connected together by means of a U-shaped guard 48 which extends outboard to protect a push down bar 50 which extends between the guide posts 42 and is vertically movable relative thereto. A hub lock-down mechanism 62, including lockdown pins 64, is mounted on the pushdown bar.

The pull-in-tool 39 is locked down on the base by means of a hydraulic cylinder 41 mounted on guide tube 40 in such a position that its piston rod 43 can pass through aligned holes in leg 44 and reaction post 30.

A cross member 56 extends between the structural members 46 and has supported thereon the pulling apparatus 58, including a bull nose latch 60. As seen in FIG. 4 the bull nose latch is positioned above, and extends outboard from, the inboard hub 24.

On the inboard side of the pull-in tool, and in line with the bull nose latch 60, there is mounted a hydraulic cable puller 66 to which the drill pipe 10 is connected. A pulling cable 68 passes through the drill pipe, through other mechanism to be discussed later, and out the bull nose latch 60.

The hydraulic cable puller may, for example, comprise jaws to grip the cable, the jaws being driven by a hydraulic cylinder, and being released after each pulling stroke. Alternatively, the cable may be pulled by a winch at the surface and the hydraulic cable puller omitted.

FIG. 5 illustrates the run-in tool as it may be set up for connection of electrical cable or control lines. Although shown centered, in this arrangement the bull nose latch 60 and the cable puller 66 may be off center. The push down bar 50 is provided with two lock down mechanisms 62.

FIG. 6 depicts the end of the flow lines 13 and the pull-in adapter 14 connected thereto. The flow lines terminate in a lock down structure 70, which is permanently fastened to the ends of the flow lines 13 and to the flow line hub 72. The flow line hub is carried within a protective cage 74, comprising a box like structure which may be covered on the bottom by a hinged cover, and plate 76 is provided with an alignment slot 77 in its upper edge. A bull nose 78 extends at right angles to the plate 76. The end of wire line 68 is connected to this bull nose. The pull-in adapter 14, comprising plate 76, with the bull nose 78, the cage 74 and a locking sleeve 80 attached thereto, are removably connected to the lock down structure 70 and hub 72 by means of a locking pin 82.

Hub 72 comprises a sealing face 72a and a collar 72b intermediate the sealing face and the lock down structure 70. A protective cover 200 is releasably attached to the hub.

As seen in FIG. 11, the lockdown structure 70 includes a pair of lock holes 71, each of which has a locking recess 73 adjacent its lower end and a stop shoulder 69 intermediate the recess and the upper end. A locking sleeve 75 having an enlarged upper end 77 is received within each lock hole 71. The sleeve is longitudinally slotted at its lower end to form a plurality of resilient fingers 79 which are enlarged at 81 for engagement in the recess 73.

Locking sleeve 80 also is slotted to form downwardly extending resilient fingers 79 having enlargements 81 for engagement in recesses 73. A lock pin 82, having a head 83 and a collar 85, fits in the base of each sleeve 80, the lower end preventing movement of the fingers 79 out of the recesses 73, and thereby securing the pull-in adapter to the hub assembly, including the lockdown structure.

FIGS. 24–27 depict one form of hub cover 200 which may be used. This cover comprises a body 201 having a U-shaped cavity 202 therein configured to fit the circumference of the hub. A protective plate 204 received within the cavity is made of a relatively soft, preferably plastic material, such as Delin, to engage the sealing face of the hub and prevent damage to it. The plate 204 is fastened to the body as by means of fastening assemblies 206, each comprising a rod 208 and a screw 210. The cover 204 is biased into engagement with the face of the hub by means of a spring 212.

The cover body is held in place on the hub by means of a pair of detents 214 each of which is carried in a tube 214. The tube 216 is secured in position so that the detent engages the hub recess by means of a rod 218 which extends out the upper end of the cover. Rods 218 are attached to a trigger plate 220. The rods are held in their uppermost position as shown in the drawing, by means of shear pins 222, each of which engages a recess 224 on one of the rods. The rods are also provided with another recess 226 which, in the position shown in FIGS. 24 and 25, is located just above the detent. The detent tube 216 has a groove 228 in one side which receives the body of the rod 218, so that the rod holds the detent in the hub recess.

Upon the application of downward force to the trigger 220 the rods 218 move downwardly, shearing the shear pins, until the recess 226 is opposite the detent tube 216. The application of additional downward force causes the tapered end of the detent 214 to be biased laterally out of the hub face recess. The hub cover therefore drops off of the hub.

The structure of posts 42 and push down bar 50 are shown in detail in FIGS. 20 and 21. As shown there, each post contains a part of telescopic hydraulic cylinders 150, 152, one of which is mounted at the bottom of the post with its rod extending upwardly and the other which is mounted at the top of the post with its rod extended downwardly. The cylinders are provided with hydraulic connections (not shown) for application of power to cause cylinder 150 to push upwardly and cylinder 152 to push downwardly. Both piston rods are connected to a single driven member 154 comprising a plate to which blocks 156, 158 are attached. Each block is bored to receive the end of a piston rod and a pin 160 to secure the rod to the block. A sleeve 162 extends upwardly from the block 158 and is provided with a mounting bracket 164 to which a link 166 is attached. The other end of each link 166 is attached to the push down bar 50.

The push down bar 50 is provided with a pair of lock down pin retainer sleeves 168 mounted on a gusset 170 which is positioned substantially centrally of the length of the push down bar and rigidly fastened thereto. Each of the sleeves 168 extends upwardly from the gusset and is provided with a semi-cylindrical window 172 positioned to receive a fork 174 which is attached to piston rod 176 of a hydraulic cylinder 178 which is mounted on the gusset 170.

A similar pair of hydraulic cylinders 180 are mounted on a bottom gusset plate 182 on the push down bar, and similar forks 185 are mounted on rods of these cylinders. These forks are positioned to be extended through windows 276 in lock down pin retainer sleeves 278.

FIG. 7 shows in plan view a pull-in adapter for hydraulic lines 84 and electric lines 86. A pair of lock down structures 70 are provided, and the lock down structures are releasably connected, by means of locking pins 82 and locking sleeves 80 to a plate 76 on which is mounted a protective cage 74a which provides protection for hubs 72a and 72b. The plate 76 also has mounted thereon a bull nose 78 to which is attached the pulling cable 68.

Figure 8:
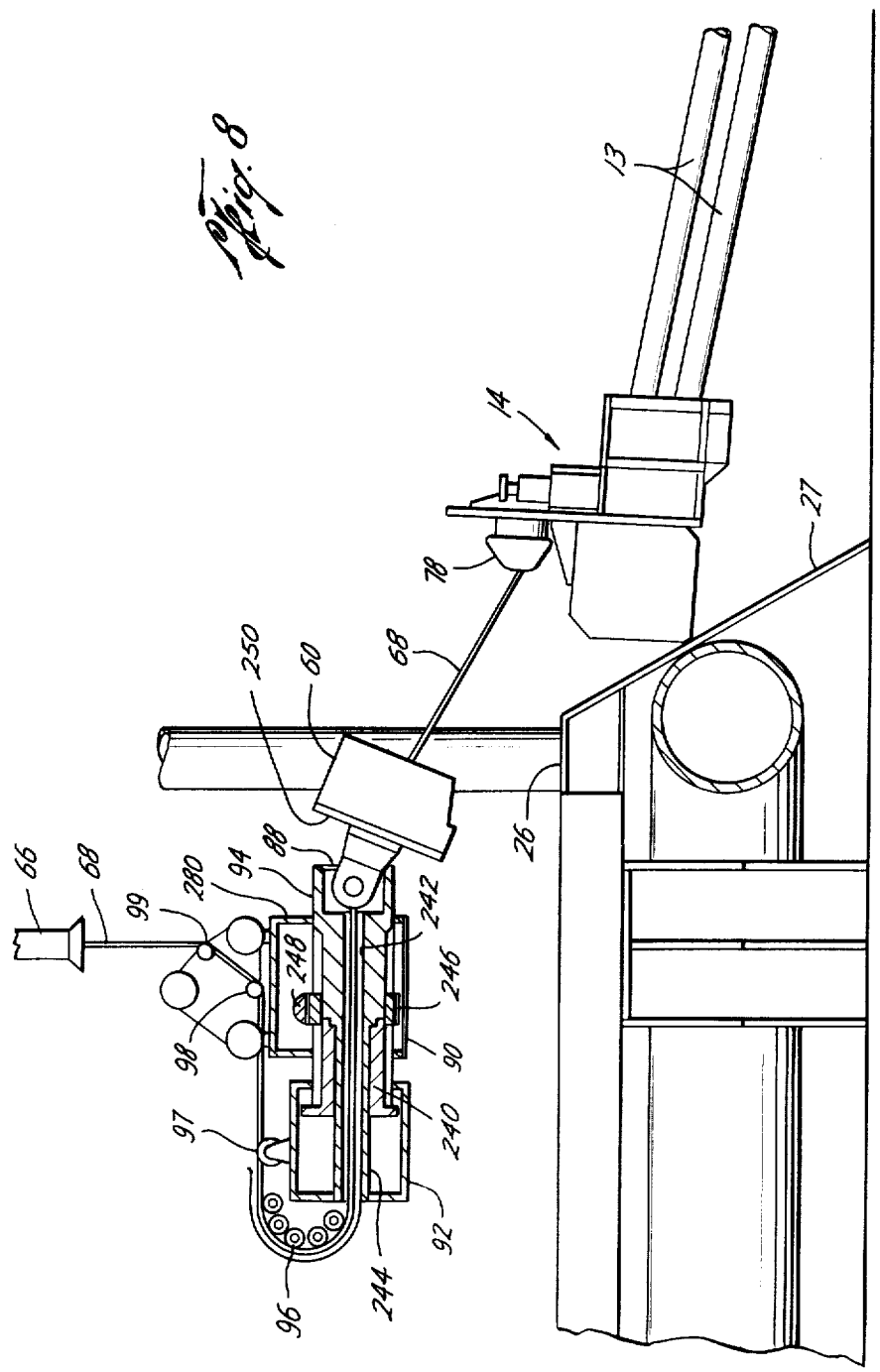
FIG. 8 is an elevational view, partly in section, showing the pulling of the pull-in adapter by the pull-in tool.

FIG. 8 shows the use of the pulling cable 68 to pull the pull-in adapter 14 up ramp 27 onto the porch 26. In some cases the pull-in adapter and hub assembly may be suspended off the bottom, but the apparatus works the same way in either event. The pulling cable extends from the bull nose latch 60, and thence through a universal joint 88, a rotary actuator 90 and a hydraulic cylinder 92. Passing out the hydraulic cylinder the pulling cable passes over a series of rollers 96 and a plurality of sheaves 97, 98, 99 before leading into the hydraulic cable puller 66.

The piston rod 94 as well as the piston 240 are bored through the center as shown at 242 to allow passage of the pulling cable therethrough. A tubular member 244 slidably and sealingly received within the cylinder 92 provides a conduit to pass the pulling cable out the end of the cylinder.

A spline gear 246 is mounted on the piston rod 94 and is engaged by a rack 248 which is connected for driving by a hydraulic cylinder, not shown. This rack, gear and cylinder combination are capable of rotating the piston rod, and therefore the latch 50, a total of in excess of 360°, i.e. at least 180° in each direction from the central position depicted in the drawings.

Figure 9:
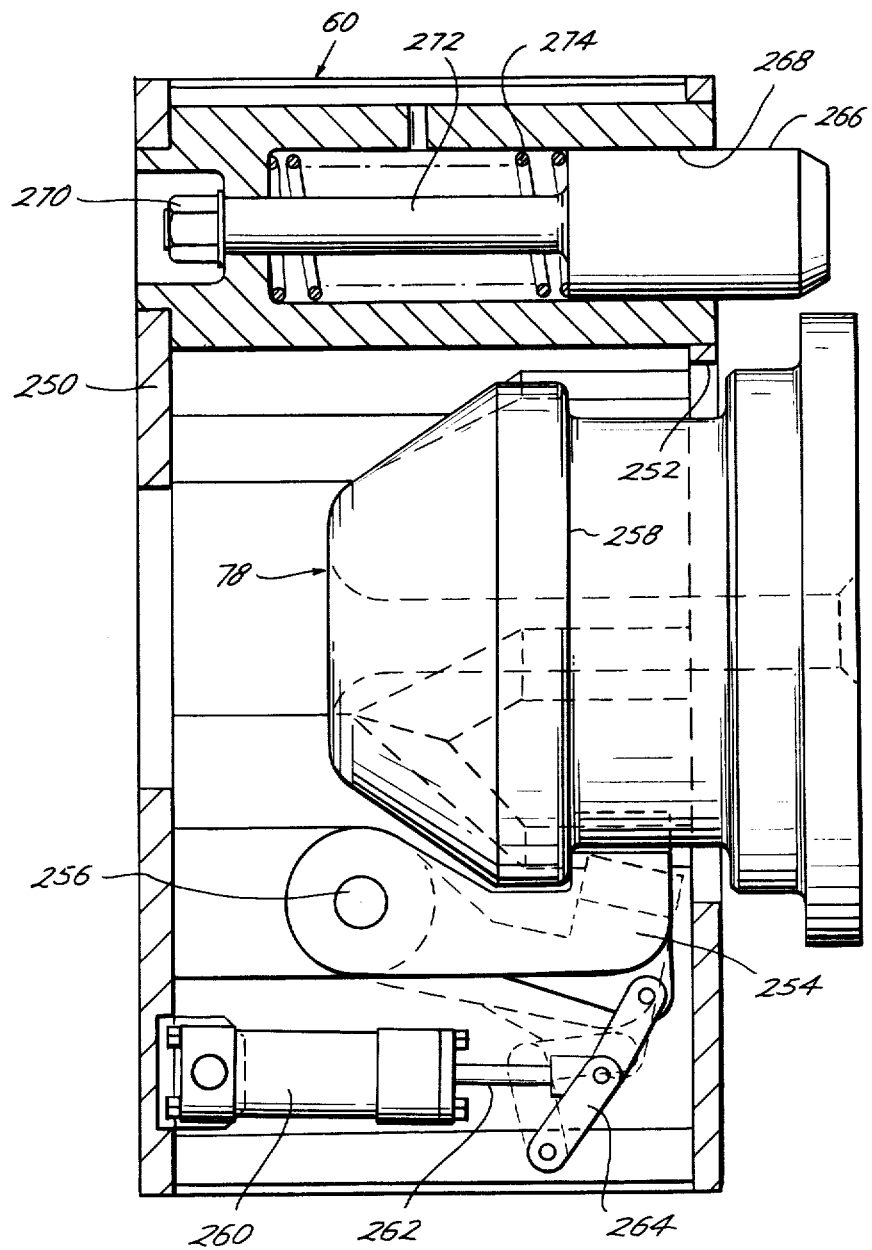
FIG. 9 is a sectional view of a latch secured to a bullplug used on one embodiment of pull-in adapter.

FIG. 9 shows one embodiment of the latch 60 with the bull nose 78 latched in place. The latch comprises a generally cylindrical housing having a back plate 250 and a front opening 252 through which the bull nose may be received. A plurality, preferably three, latch jaws 254 are pivotally mounted at 256 in a position to be swung into engagement behind the shoulder 258 of the bull nose. Pivoting is obtained by means of a hydraulic cylinder 260, one of which is provided for each latch jaw. The piston rod 262 of the hydraulic cylinder is pivotally connected, as by linkage 264, to the latch jaw 254. The latch housing also contains an orientation pin 266 which is slidably received within a cylindrical hole 268 in the face of the latch. The orientation pin is retained in the hole 268 by means of a lock nut 270 screwed on to the end of a reduced diameter portion 272 of the orientation pin. A spring 274 biases the orientation pin to the position shown in the drawing, i.e. with the end of the pin extending beyond the fact of the latch.

FIG. 10 shows a plan view depicting the relative positions of the latch 60 and the pull-in adapter 14 assembled on the hub at the point where bull nose is pulled into the latch. At this point, in the usual case, the flow line and its hub 72 will not be in alignment with the inboard hub. However, the flow line hub will be in approximately its final location.

FIG. 16 shows the flow line connector running tool 100 being lowered into place by means of a drill pipe running string 10. The connector running tool 100 is guided into proper position by means of guide tubes 107 which follow guide posts 22 and guide lines 11. The flow line connector running tool comprises a support frame having a header 102 and a part of depending vertical frame members 104. One frame member 104 has mounted thereon a fork 105, and another fork 106 (see FIG. 22) is mounted on a support member 110 which is movable laterally relative to the frame members 104. A plurality of hydraulic cylinders 108 extend between fork 105 and support member 110 which is slideably mounted on rods 112 extending between the frame members 104. Two hydraulic motors 113 and gear boxes 114 are mounted for horizontal movement with the hydraulic cylinders. A hexagonal socket 115 is connected for driving by the output shaft of each gearbox. A flow-line connector 116 is supported below the gear boxes through a pair of pins 118.

The flow line connector may be of the type shown in U.S. Pat. No. 3,843,168 issued Oct. 22, 1974 on the application of Morrill, et al., and entitled "Clamp Connectors". Such connectors, as seen, for example, in FIG. 16, include a pair of plates 120, 122 attached to a seal plate 124 which is carried between the two halves 126, 128 of a clamp. A pair of cylindrical sleeves 130 extend between the upper plate 120 and the lower plate 122 and receive therethrough the pins 118 which depend from the running tool 100. As seen in FIG. 23 each pin 118 is provided near its lower end with a pair of laterally slidable latch members 132 positioned for engagement by a conical wedge 134 carried on the end of a rod 136, which in turn is fastened to a piston 138. Piston 138 is carried within a cylindrical cavity 140 within the pin, and is biased upwardly by means of a spring 142. A hydraulic line 144 is provided to conduct hydraulic fluid to and from the cylindrical cavity.

For the sake of simplicity, no attempt has been made to show all the hydraulic lines and connections which are necessary to operate the equipment described, since these are well known in the art. Such connections and lines are provided where necessary, and hydraulic hoses are connected before the tools are lowered. These may then be strapped to the drill pipe as each tool is lowered. A suitable control panel, as is also well-known in the art, is provided on vessel A so that the tools may be operated, as hereinafter described.

OPERATION

The operation of the apparatus and method of this invention begins with the establishment of the guide lines 11 between the vessel A and the subsea production unit 12.

The pull-in tool is tested on vessel A to make sure that it functions properly. The flow line bundle is assembled on vessel B and the pull-in adapter 14, the flow line hub assembly, and the protective cover are attached thereto. The necessary hydraulic hoses are attached to the pull-in tool 39, the wire line 68 comprising the pull-in cable is prepared by attaching a retrieval dart on one end and a swivel head on the other; the retrieval dart is installed in the cable puller 66 and the swivel head end is installed in the bull nose 78 on vessel B. The guide lines are then threaded through the guide tubes 40 on the pull-in tool, the drill pipe 10 is connected to the hydraulic cable puller 66 and the tool is lowered to the bottom. While it is being lowered the pull-in cable is paid out from vessel B, maintaining tension on it to prevent entanglement. As the tool approaches the porch, pressure is applied to the "release" side of the pull-in tool lock down cylinder 41. The tool is then landed on the porch and pressure is applied to the "lock" side of the lock down cylinder. The drill pipe is then pulled upwardly with a force of, for example, 5,000 pounds over the weight of the running string and pull-in tool, the force being sufficient to insure that the tool is locked to the porch. Pressure is applied to cylinders 150 to insure that the assembly is properly elevated. This pressure is maintained throughout the pull-in operation. The cable retrieving dart is fished through the drill pipe and pulled to the surface, paying out pull-in cable from vessel B to compensate. Tension is maintained on the cable to prevent entanglement. On vessel A the end of the pull-in cable is attached to a winch.

The flow line bundle is then lowered from vessel B toward the seabed, with excess cable being reeled in on vessel A. It is important to carefully note pull-in loads in order to avoid exceeding the maximum cable capacity. After the flow line bundle has neared or reached the seabed, pulling by means of the cable is continued until the pull-in adapter 14 approaches the ramp 27. Preferably a television camera is used to view the operation to determine when the adapter is in a suitable position. Pulling is continued until the bull nose 78 enters the bull nose latch 60. This can be monitored by means of the television camera. In addition entry can be identified by the sudden increase in the load on the pull-in cable. If necessary, water may be pumped down through the drill pipe to jet wash the pull-in adapter.

When the bull nose has entered the latch, pressure is applied to the "lock" side of the bull nose latch hydraulic cylinders 260 to cause the jaws 254 of the latch to close around the bull nose. In order to achieve proper radial alignment the rotary actuator 90 is actuated to rotate the latch in either the clockwise or counterclockwise direction until the bull nose latch orientation pin 266 engages the slot 77 in the pull-in adapter. The rotary actuator is then operated again to rotate the pull-in adapter 14 with the attached flow line hub 72 until it is in proper alignment with the inboard hub 24.

At this point the latch and flow line adapter assembly may, for example, be in the condition shown in FIG. 10, since is is expected that there will be some misalignment in the usual case. Fluid pressure is then applied to the hydraulic cylinder 92, causing the back plate 250 of the latch 60 to be pulled into engagement with the front plate 280 of the rotary actuator 90. When one edge of the plate 250 engages the plate 280, additional pulling causes the latch with the attached flow line adapter to pivot about the contacting edge until the plates are in full contact and the outboard flow line hub is axially aligned with the inboard hub.

At this point the various structures are in the positions shown in FIG. 11. The push down bar 50 is then lowered by means of the telescoping hydraulic cylinders 150, 152 until the lower ends of the retainer sleeves 184 engage the upper ends 77 of the locking sleeves 75. As seen in FIG. 11, the sleeve 184 carries within it a lock pin 186 which is supported therein by means of the fork 185. The lock pin is provided, near its lower end, with a spring loaded latch 188. When the sleeve 184 moves into engagement with the upper end of the sleeve 75, as shown in FIG. 12, the lower end of the pin does not extend into the lower reduced diameter bore 190 of the sleeve 75. Thus downward pressure on the sleeve 75 causes the enlarged portions 81 to be biased inwardly from the recess 73 so that the sleeve moves downwardly into a recess 192 in the lock down hole 32 in the porch, as seen in FIG. 12. The forks 174 are then withdrawn and the push down bar 50 is elevated until the forks are above the top of the pin 186, as seen in FIG. 13. The forks are again extended into the sleeve 184 and the push down bar 50 is moved downwardly. The forks engage the upward end of the pin 186 pushing the pin downwardly until it extends into the lower reduced diameter bore 190. The enlarged ends 81 of the fingers 79 are thus held in engagement with recess 192 so that the lock down structure 70 is locked to the porch 26.

The forks 174 are then withdrawn again, and the push down bar 50 is lowered until sleeve 162 rests upon the upper end of locking sleeve 80, as seen in FIG. 14. The hydraulic cylinders 178, 180 are then energized to move the forks 174 into sleeve 168, engaging the lock pin 82 between the head 83 and the collar 85.

As seen in FIG. 15 the push down bar 50 is then moved upwardly. The movement of the forks 174 pulls the pin 82 from the sleeve 80, thereby unlocking the sleeve. Hydraulic cylinder 41 (see FIG. 4) is then retracted to release the pull-in tool from the base, and the entire pull-in tool is raised upwardly by means of the drill pipe 10, thereby pulling the sleeve 80 from the lock down structure 70 and removing the protective cage 74 from its position covering the outboard flow line hub 72. The inboard hub 24 and outboard hub 72 are thus left positioned substantially in their final positions, each protected by a protective cover 200.

Figure 18:
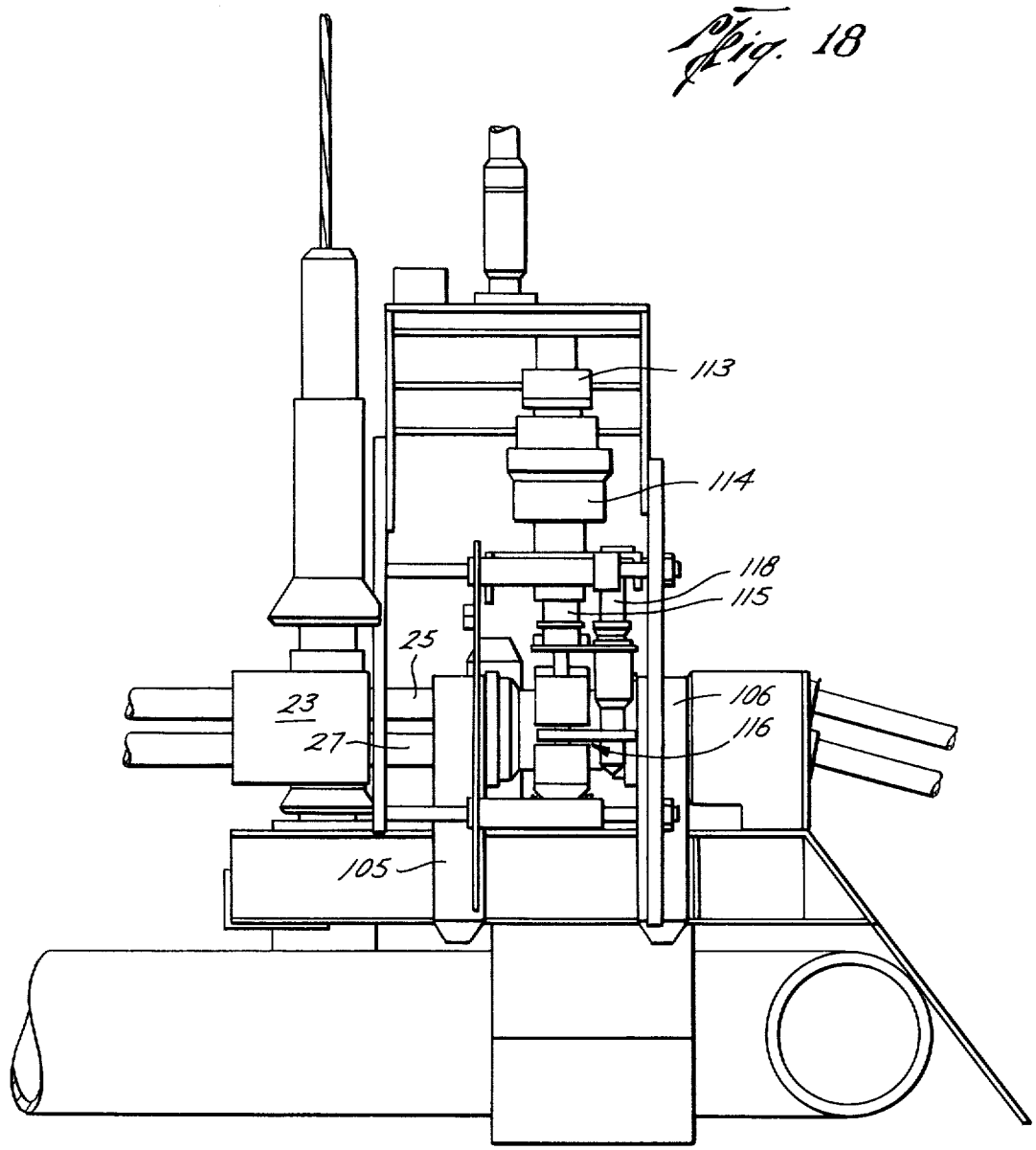

The flow line connector running tool 100 is then installed on the guide lines 11 and lowered on drill pipe 10, as seen in FIG. 16. As the tool moves downwardly the forks 105, 106 straddle the hub saddles 192, 194 behind the collars 24c and 72b. Upon further downward movement buttons 211 engage trigger plates 220, thereby releasing the protective covers 200, causing them to drop off the inboard and outboard hubs. The final position of the flow line connector running tool is as shown in FIG. 17, with the seal plate 124 between the two hubs. The hydraulic cylinders 108 are then energized to pull the two hubs together by force exerted on the forks 105, 106, as seen in FIG. 18. Since the outboard hub is latched down on the porch, only the inboard hub moves, by sliding through bearing housing 23, such movement being absorbed in the flow line loops on the Christmas tree.

The two halves of the clamp assembly 116 are then moved together to clamp the facing hubs into sealing engagement with the seal member by rotation of the hexagon socket 115 which is driven by the motors 113 and the gear box 114.

Hydraulic pressure is then applied to the piston 138 in the pin 118 to thereby release the latch members 132. The entire flow connector running tool is then hoisted upwardly by means of the drill pipe, as shown in FIG. 19, and may be retrieved to vessel A.

The apparatus of the present invention also provides means for re-entering, disconnecting the hubs, and retrieving or replacing the seal unit, and also for unlocking the flow line hub from the porch and raising it to the surface for repair or replacement, if such should be necessary.

Thus the flow line connector running tool 100 may again be lowered by means of the drill pipe, the forks 105 and 106 straddling the hub saddles 192, 194 behind the collars 24c and 72b. The pins 118 will enter the sleeves 130 and move downwardly therein until the latch members 132 emerge from the bottom. The hex sockets 115 will engage the hexagon drivers of the clamp and the motor 113 may then be energized to open the clamp, thereby releasing the hubs and the seal member. When the running tool 100 is elevated, the pins 118 will carry the clamp and sealing member upwardly with the running tool. A new sealing member may then be installed in the same manner as heretofore described.

Where it is necessary to repair or replace a flow line hub the pull-in tool 39 is lowered with the pull-in in adapter 14 in place. Sleeve 80 will enter the lock down structure 70 and engage the recess 73. Cylinder 41 is actuated to lock the pull-in tool to the porch. The push down bar 50 is lowered to carry the pin 82 into sleeve 80 and thereby lock it to the lock down structure. The forks 174 are actuated to engage pins 18 whereby upon upward movement of the push down bar 50 the pins are pulled. The latches 188 engage the lower ends of sleeves 75, pulling the sleeves from the locking holes 71, thereby unlocking the lock down structure from the porch. The lock down cylinder 41 may then be retracted and the entire pull-in apparatus may be elevated to the surface, carrying with it the end of the flow line hub. Alternatively, or in addition, a pull-in cable could have been lowered with the pull-in adapter and this cable utilized to assist in the lifting.

Although this invention has been described primarily in terms of the connection of a flow line to an underwater production unit, the same apparatus and method may be used for connection of electrical cables and hydraulic control lines, as previously indicated. Such modifications as may be necessary to achieve such connections will be apparent to those skilled in the art.

Various other embodiments and modifications will also be apparent from the foregoing description. The invention is therefore not limited to the specific embodiments disclosed, but extends to every embodiment within the scope of the appended claims.

I claim:
1. Apparatus for remotely connecting a pair of axially aligned underwater hubs, comprising:
   a collar on each hub,
   a connector tool including a rigid main frame and a subframe horizontally slidably mounted on said main frame,
   a first fork fixedly mounted on said main frame and a second fork mounted on said subframe,
   a seal member supported from said subframe,
   means for lowering said connector tool through the water to a position such that each fork is engaged behind a hub collar and said seal member is between the hubs,
   first fluid powered means mounted on said subframe for applying force to said hubs to move them axially toward each other whereby said hubs are moved into sealing engagement with said seal member,
   connecting means releasably carried by said connector tool for connecting said hubs together in sealing engagement with said seal member, and
   second fluid powered means mounted on said subframe operably engaging said connecting means for moving the connecting means laterally into engagement with said hubs.
2. Apparatus as defined by claim 1 further including means for remotely disconnecting the pair of axially aligned underwater hubs, biased against one another into sealing engagement by said connector tool, comprising:
   a latchdown pin connected to said connector tool,
   at least one laterally slidable latch member,
   a spring loaded conical wedge biasing said latch member into latching position,
   a hydraulic piston in a cylinder, said piston being fastened to said wedge within said latchdown pin, and
   a source of hydraulic fluid connected to said cylinder for remotely operating said hydraulic piston so as to push down said wedge and permit said latch member to be biased toward unlatched position.
3. Apparatus as defined by claim 1, wherein said connecting means are carried on a vertically movable pin having a transversely actuable latch.

4. Apparatus as defined in claim 1 wherein said connector tool includes a rigid main frame and a subframe horizontally slidably mounted within said main frame, said subframe carrying said forks, said first and second fluid powered means, said connecting means and said seal member.

5. Apparatus as defined by claim 1 wherein said first fluid powered means include a plurality of lateral hydraulic cylinders, said cylinders housing pistons attached to said first fork and pulling said subframe with said second fork toward said first fork when actuated by remote operation.

6. Apparatus as defined by claim 1 wherein said second fluid powered means include a rotary hydraulic motor releasably engaging a threaded rod for clamping together said connecting means.

7. Apparatus defined by claim 1, and including:
means for disengaging said connector tool from said connecting means, whereby the connector tool can be elevated to the surface, leaving behind substantially only the connecting means and the seal member,
means for re-engaging said connector tool with said connecting means, whereby said second fluid powered means may also be used for disengaging said connecting means from sealing engagement with said seal means, and whereby said first fluid powered means may also be used for reapplying force to said hubs to move them axially apart from each other, thereby permitting said seal member together with said connector tool to be elevated back to the surface level.

8. Apparatus as defined by claim 1 wherein said apparatus further includes bearing guide means for facilitating the lateral movement of one of said hubs toward the other.

9. Apparatus for remotely connecting a pair of axially aligned underwater hubs, comprising:
a collar on each hub,
a connector tool,
a pair of forks depending from said connector tool,
a seal member supported on said connector tool,
means for lowering said connector tool through the water to a position such that each fork is engaged behind a hub collar and said seal member is between the hubs,
first fluid powered means on said connector tool for applying force to said hubs to move them axially toward each other whereby said hubs are moved into sealing engagement with said seal member,
connecting means releaseably carried by said connector tool for connecting said hubs together in sealing engagement with said seal member,
second fluid powered means on said connector tool operably engaging said connecting means for moving the connecting means laterally into engagement with said hubs,
means for disengaging said connector tool from said connecting means, whereby the connector tool can be elevated to the surface, leaving behind substantially only the connecting means and the seal member.
said connector tool having a latchdown pin and said disengaging means including at least one laterally slidable latch member biased into latching position by a spring loaded conical wedge, said wedge being fastened to a hydraulic piston in a cylinder within the latchdown pin of said connector tool, said hydraulic cylinder being connected to a source of hydraulic fluid so as to be remotely operable to push down said wedge and permit said latch member to be biased toward unlatched position.

10. Apparatus for remotely disconnecting a pair of sealingly connected underwater hubs, comprising:
a collar on each hub,
a connecting tool, including a rigid main frame and a subframe horizontally slidably mounted on said main frame,
a first fork fixedly mounted on said main frame and a second fork mounted on said subframe,
a seal member in fluid communicating contact with said hubs,
means for lowering said connector tool through the water to a position such that each fork is engaged behind a hub collar,
connecting means attached to said seal member for biasing and holding said hubs together in sealing engagement with said seal member,
means for releasably attaching said connecting means to said connector tool,
first fluid powered means mounted on said subframe operably engaging said connecting means for disengaging said connecting means from said hubs, and
second fluid powered means mounted on said subframe for applying force to said forks for moving said hubs apart and away from said seal member.

11. A connector tool for remotely connecting a movable hub to a fixed hub axially aligned underwater and each having a hub collar, comprising:
a frame having first and second frame members and a plurality of rods extending therebetween,
a support member slidably mounted on said rods,
first hydraulic means for sliding said support member on said rods,
a flowline connector releasably mounted on said support member for clamping the hubs together,
second hydraulic means mounted on said support member for actuating said flowline connector,
a first fork fixedly mounted on said first frame member and adapted to engage the fixed hub collar, and
a second fork mounted on said support member and adapted to engage the movable hub collar whereby said first hydraulic means moves said second fork, the movable hub, said flowline connector and said second hydraulic means towards the fixed hub and said second hydraulic means actuates said flowline connector to clamp the hubs together.

12. The connector tool as defined by claim 11 wherein said first hydraulic means includes hydraulic cylinders receiving said rods and attached to said support member.

13. The connector tool as defined by claim 11 wherein said second hydraulic means includes a plurality of hydraulic motors having a releasable drive connection thereon.

14. The connector tool as defined by claim 13 wherein said hydraulic motors have gear boxes connected thereto.

15. The connector tool as defined by claim 13 wherein said flowline connector includes a clamp driven by mechanical means, said mechanical means having a member cooperable with said releasable drive connection.

16. The connector tool as defined by claim 11 wherein said flowline connector includes two plates supporting a seal plate between two halves of a clamp.

17. The connector tool as defined by claim 11 wherein said flowline connector includes a plurality of cylindrical sleeves receiving pins depending from said support member, said pins having releasable latch means for latching said flowline connector to said support member.

18. The connector tool as defined by claim 17 wherein said releasable latch means includes a pair of laterally slidable latch members positioned for engagement by a conical wedge carried on the end of a rod which in turn is fastened to a piston, said piston being carried within a cylindrical cavity within said pins.

19. The connector tool as defined by claim 11 wherein said plurality of rods includes at least four rods spaced around said flowline connector.

20. The connector tool as defined by claim 11 wherein said flowline connector includes a seal plate mounted between two halves of a clamp, said seal plate being mounted on said clamp.

21. A connector tool for remotely connecting a pair of axially aligned underwater hubs each having a hub collar, comprising:
 a support frame having a header and first and second depending vertical frame members; said first frame member having a first fork mounted thereon, said first fork adapted to straddle one of the hubs and to engage its hub collar,
 at least four rods extending between said first and second frame members, each of said rods having a hydraulic cylinder mounted thereon,
 a support member slidably mounted on said rods and attached to said hydraulic cylinders; said support member having a second fork mounted thereon, said second fork adapted to straddle the other one of the hubs and to engage its hub collar,
 two hydraulic motors with gear boxes mounted on said support member and adapted for horizontal movement with said support member, each gear box having a output shaft with a hexagonal socket,
 a flowline connector supported below said gear boxes on said hydraulic cylinders by pins, said flowline connector including two plates supporting a seal plate between two halves of a clamp,
 a pair of cylindrical sleeves extending between said plates and receiving therethrough said pins, said pins each having a pair of laterally slidable latch members positioned for engagement by a conical wedge carried on the end of a rod which in turn is fastened to a piston, and said piston being carried within a cylindrical cavity within said pin and being biased upwardly by spring means, said latch member engaging one of said plates in the latching position, and
 mechanical means for moving said clamp halves together into engagement with the hubs, said mechanical means having a hexagonal shaft received by said hexagonal socket.

22. A method for remotely handling axially aligned underwater hubs, comprising:
 lowering a connector tool to a position to engage the hubs,
 positioning a seal member between the hubs,
 moving a hydraulic actuator on the connector tool toward one of the hubs,
 hydraulically applying force to the hubs from the connector tool to move them axially toward each other and into sealing engagement with the seal member, hydraulically applying force from the hydraulic actuator to connect the hubs in sealing engagement with the seal member,
 disengaging the connector tool from the seal member, and retrieving the connector tool.

23. A method defined by claim 22 comprising the additional steps of
 lowering said connector tool again to a position to engage said hubs,
 connecting said connector tool with said seal member,
 hydraulically applying force from said connector tool to disconnect said hubs from sealing engagement with said seal member,
 hydraulically applying force to said hubs from said connector tool to move them apart and away from said seal member, and
 retrieving said connector tool with said seal member attached to it.

24. A method for remotely disconnecting a pair of underwater hubs in sealing engagement with a seal member biased in between and against said hubs, comprising:
 lowering a connector tool to a position to engage said hubs,
 connecting said connector tool with said seal member,
 hydraulically applying force from said connector tool to disconnect said hubs from sealing engagement with said seal member,
 hydraulically applying force to said hubs from said connector tool to move them apart and away from said seal member, and
 retrieving said connector tool with said seal member attached to it.

* * * * *